(12) United States Patent
Bennett et al.

(10) Patent No.: US 8,398,020 B2
(45) Date of Patent: Mar. 19, 2013

(54) LANDING GEAR

(75) Inventors: Ian Bennett, Gloucester (GB); Richard Charles Lang, Gloucestershire (GB); Robert Anthony Menezes, Bristol (GB)

(73) Assignee: Messier-Dowty Limited, Gloucester (GB)

( * ) Notice: Subject to any disclaimer, the term of this patent is extended or adjusted under 35 U.S.C. 154(b) by 0 days.

(21) Appl. No.: 13/332,680

(22) Filed: Dec. 21, 2011

(65) Prior Publication Data

US 2012/0112001 A1     May 10, 2012

Related U.S. Application Data

(63) Continuation of application No. 11/997,720, filed as application No. PCT/GB2006/002918 on Aug. 4, 2006, now Pat. No. 8,104,711.

(30) Foreign Application Priority Data

Aug. 4, 2005 (GB) .................................. 0516030.4

(51) Int. Cl.
    *B64C 25/00*     (2006.01)
    *B64C 25/58*     (2006.01)

(52) U.S. Cl. ........................... 244/102 SL; 244/102 A

(58) Field of Classification Search ............ 244/100 R, 244/102 R, 102 A, 102 SL, 102 SS
See application file for complete search history.

(56) References Cited

U.S. PATENT DOCUMENTS

| | | | |
|---|---|---|---|
| 1,442,968 A | 1/1923 | Paul | |
| 2,487,548 A | 11/1949 | Hawkins, Jr. | |
| 2,510,969 A | 6/1950 | Gassner | |
| 2,579,180 A * | 12/1951 | Eldred | 244/104 FP |
| 2,891,788 A | 6/1959 | Stoner | |
| 3,083,937 A | 4/1963 | Bainbridge et al. | |
| 3,322,376 A | 5/1967 | Neilson et al. | |
| 3,877,349 A | 4/1975 | Schindel | |
| 4,852,464 A | 8/1989 | Bartmann et al. | |
| 4,892,270 A | 1/1990 | Derrien et al. | |
| 4,991,493 A | 2/1991 | Luojus | |

(Continued)

FOREIGN PATENT DOCUMENTS

| | | |
|---|---|---|
| EP | 0 295 174 A1 | 12/1988 |
| EP | 0 328 395 A2 | 8/1989 |

(Continued)

OTHER PUBLICATIONS

U.K. Search Report for GB Application No. 0516030.4 dated Jan. 24, 2006, Claims searched: 1-16 and 56, 1 page.

(Continued)

*Primary Examiner* — Tien Dinh
*Assistant Examiner* — Richard R Green
(74) *Attorney, Agent, or Firm* — Marshall, Gerstein & Borun LLP

(57) ABSTRACT

An auxiliary mechanism includes a lever unit, a spring unit and a positioning unit. One of the units pivotally connects to the upper portion of a main shock absorber strut so as to pivot between a predetermined lower position for take-off and landing and an upper position. Another unit pivotally connects at an upper end to the upper portion of the main shock absorber strut and pivotally connects at a lower end to the first unit. A third unit pivotally connects at a lower end to the bogie beam at an auxiliary pivot and connects at an upper end to the lever. The positioning unit assumes either a contracted state or extended state for taxiing, take-off and landing, and assumes the other state for stowing the landing gear after take-off. The spring unit provides spring resistance to pivotal movements of the bogie beam about the main pivot during taxiing.

8 Claims, 21 Drawing Sheets

U.S. PATENT DOCUMENTS

| | | | |
|---|---|---|---|
| 5,429,323 | A | 7/1995 | Derrien et al. |
| 5,460,340 | A | 10/1995 | White |
| 6,073,886 | A | 6/2000 | Jakubowski, Jr. et al. |
| 6,279,854 | B1 | 8/2001 | Lindahl |
| 6,308,916 | B1 | 10/2001 | Hrusch |
| 6,575,405 | B2 | 6/2003 | Bryant et al. |
| 2003/0033927 | A1 | 2/2003 | Bryant et al. |

FOREIGN PATENT DOCUMENTS

| | | |
|---|---|---|
| EP | 0 607 721 A1 | 7/1994 |
| EP | 1 041 001 A2 | 10/2000 |
| FR | 2 667 909 | 4/1992 |
| GB | 650547 | 2/1951 |
| GB | 663245 | 12/1951 |
| GB | 664548 | 1/1952 |
| GB | 666511 | 2/1952 |
| GB | 893013 | 4/1962 |
| GB | 1024455 | 3/1966 |

OTHER PUBLICATIONS

U.K. Search Report for GB Application No. 0516030.4 dated Nov. 22, 2007, Claims searched: 17-41 and 55, 1 page.
U.K. Search Report for GB Application No. 0516030.4 dated Nov. 22, 2007, Claims searched: 42-49 and 57, 1 page.
U.K. Search Report for GB Application No. 0516030.4 dated Nov. 23, 2007, Claims searched: 59, 1 page.
U.K. Search Report for GB Application No. 0516030.4 dated Nov. 23, 2007, Claims searched: 50-54 and 58, 1 page.
Extended European Search Report for EP Application No. 09 16 0692 dated Oct. 29, 2009, 6 pages.
Examination Report under Section 18(3) for GB Application No. 0516030.4 dated Jan. 18, 2010, 3 pages.
Combined Search and Examination Report under Sections 17 and 18(3) for GB Application No. 1012570.6 dated Sep. 15, 2010, 5 pages.
Combined Search and Examination Report under Sections 17 and 18(3)for GB Application No. 1012571.4 dated Sep. 15, 2010, 5 pages.
Examination Report in EP Application No. 06765221.4 dated Sep. 23, 2011.
International Search Report for International Application No. PCT/GB2006/002918 dated Nov. 22, 2006.

* cited by examiner

LANDING GEAR

CROSS-REFERENCE TO RELATED APPLICATIONS

This is a continuation application which is based on and claims priority to U.S. application Ser. No. 11/997,720 entitled "Landing Gear," filed Sep. 10, 2008, which, in turn, is a national stage filing of PCT/GB2006/002918 filed on Aug. 4, 2006, which, in turn, claims priority benefit under 35 USC §119 of Great Britain patent application number 0516030.4, filed on Aug. 4, 2005, the entire disclosures of which are hereby incorporated by reference herein in their entirety.

BACKGROUND

1. Technical Field

This invention relates to a semi-levered landing gear for an aircraft.

2. Related Technology

A semi-levered landing gear incorporates functionality which allows the length of the landing gear to be increased for take-off and landing, thereby increasing the height of the aircraft above the runway and allowing greater aircraft rotation for a quicker take-off.

Typical landing gear comprises a main hydraulic shock absorber strut having an upper portion adapted to be connected to the underside of the aircraft, and a lower portion telescoping within the upper portion and pivotally connect to a multi-axle bogie. The bogie comprises a bogie beam which extends fore and aft of the aircraft, with axles and wheels mounted on the bogie beam fore and aft of a main pivot, by which the bogie beam is connected to the lower portion of the main strut. An auxiliary actuator is connected between the upper portion of the main strut and the front of the bogie beam to control the angular position of the bogie beam during taxiing, take-off and landing. When taxiing, the bogie beam is held substantially horizontal so that all the wheels contact the runway to support the aircraft, and the auxiliary actuator provides a hydraulic damping function that damps pivoting movements of the bogie as it engages bumps or dips in the runway. The auxiliary actuator also provides a positioning function to position the bogie for take-off and landing. During take-off, as uplift increases, the main strut extends and the auxiliary actuator extends with it to a maximum length. At this maximum length, the front of the bogie beam is restrained in height and the bogie beam tilts downwards at the rear as the main strut continues to extend. The rear wheels therefore maintain contact with the runway while the forward wheels lift off the ground, the length of the landing gear thereby being effectively increased. On landing, a reverse process is performed with the bogie beam tilted downwards towards the rear wheels so that they touch the runway first. As load increases, the auxiliary actuator maintains the height of the front of the bogie position relative to the main strut and the main strut is compressed until all wheels contact the ground.

It is also necessary to provide actuator means to stow landing gear after take-off and to deploy the landing gear for landing. In order that the stowing operation can take place, the bogie beam may need to be positioned in a more horizontal stowing position, and in one example, this is achieved by operation of the main strut.

An object of the invention is to provide an improved semi-levered landing gear.

SUMMARY

According to a first aspect of the invention, a semi-levered landing gear for an aircraft comprises: a main shock absorber strut with upper and lower telescoping portions, with the upper portion connectable to the airframe; a bogie beam to extend fore and aft of the aircraft fuselage with at least one forward axle and one aft axle for respective forward and aft wheels and a main pivot between the forward and aft axles pivotally connected to the lower portion of the main shock absorber strut; and an auxiliary actuator having an upper connector pivotally connected to the upper portion of the main shock absorber strut and a lower connector pivotally connected to the bogie beam at an auxiliary pivot, the auxiliary actuator comprising a two stage telescopic hydraulic unit comprising an outer casing with a first stage piston and cylinder actuator and a second stage piston and cylinder actuator operating coaxially within the outer casing, each of the first and second stage actuators being connected to a respective one of said upper and lower connectors, wherein the first stage actuator is operable by spring means to an extended position defined by axial engagement of an end stop between the piston and cylinder of the first stage actuator and provides spring resistance to retraction of the first stage actuator, and the second stage actuator is operable between a retracted position and an extended position defined by respective end stops within the outer casing and serves to control the tilt position of the bogie beam relative to the main shock absorber strut, the second stage actuator, when in the retracted position with the first stage actuator in the extended position, limiting the length of the auxiliary actuator between the upper and lower connectors so as to assume a predetermined intermediate length in which the bogie beam is restrained to tilt about the auxiliary pivot and the landing gear is thereby lengthened during take-off of the aircraft, and the second stage actuator, when in the extended position with the first stage actuator in the extended position, allowing the length of the auxiliary actuator between the upper and lower connectors to assume a predetermined maximum length in which the bogie beam is tilted about the main pivot to a stowing position for stowing the landing gear in the aircraft.

The auxiliary actuator therefore provides three functions: a damping function when taxiing, a semi-levered function before take-off, and a stowing function after take-off.

In a preferred embodiment of the invention, the second stage actuator comprises a second piston slidable within a bore of the outer casing to engage a stop at a closed end of the outer casing to define the retracted position, the closed end being connected to the upper connector. The second piston is connected to a second piston rod which is tubular and extends from the second piston through a gland in an open end of the outer casing opposite said closed end of the outer casing. The first stage actuator comprises a first piston slidable within a bore of the second piston rod, and a first piston rod which extends through a gland in the open end of the second tubular piston rod and carries said lower connector at its outer end. The extended position of the first stage actuator is defined by stops within the second piston rod which engage axially. A hydraulic control valve is provided to control the auxiliary actuator by connecting hydraulic pressure or a return source to the second piston, these connections being able to be switched to reverse the sense of operation of the second stage actuator. Preferably, the same hydraulic pressure supply is connected to the first stage actuator, and the first piston incorporates a restricted hydraulic aperture through which hydraulic fluid flows in the course of the damping action.

According to a second aspect of the invention, a semi-levered landing gear for an aircraft comprises: a main shock absorber strut with upper and lower telescoping portions, with the upper portion connectable to the airframe; a bogie beam to extend fore and aft of the airframe with at least one forward axle and one aft axle for respective forward and aft wheels and a main pivot between the forward and aft axle pivotally connected to the lower portion of the main shock absorber strut; and an auxiliary actuator having an upper connector pivotally connected to the upper portion of the main shock absorber strut and a lower connector pivotally connected to the bogie beam at an auxiliary pivot, the auxiliary actuator comprising a two stage telescopic hydraulic unit comprising an outer casing with a first stage piston and cylinder actuator and a second stage piston and cylinder actuator operating coaxially within the outer casing, each of the first and second stage actuators incorporating a piston rod which extends from a respective end of the casing and is connected to a respective one of said upper and lower connectors, wherein the first stage actuator provides damping of pivoting movements of the bogie beam about the main pivot and is operable to an extended position and the second stage actuator is operable between a retracted position and an extended position defined by respective end stops within the outer casing and serves to control the tilt position of the bogie beam relative to the main shock absorber strut, the second stage actuator, when in the retracted position with the first stage actuator in the extended position, limiting the length of the auxiliary actuator between the upper and lower connectors so as to assume a predetermined intermediate length in which the bogie beam is restrained to tilt about the auxiliary pivot and the landing gear is lengthened during take-off of the aircraft, and the second stage actuator, when in the extended position with the first stage actuator in the extended position, allowing the length of the auxiliary actuator between the upper and lower connectors to assume a predetermined maximum length in which the bogie beam is tilted about the main pivot to a stowing position for stowing the landing gear in the aircraft.

According to a third aspect of the invention, a semi-levered landing gear for an aircraft comprises: a main shock absorber strut with upper and lower telescoping portions, with the upper portion connectable to the airframe; a bogie beam to extend fore and aft of the aircraft fuselage with at least one forward axle and one aft axle for respective forward and aft wheels and a main pivot between the forward and aft axle pivotally connected to the lower portion of the main shock absorber strut; and an auxiliary mechanism comprising a lever unit, a spring unit and a positioning unit, with a first one of said units pivotally connected to the upper portion of the main shock absorber strut so as to pivot between a predetermined lower position for take-off and landing and an upper position, a second one of said units pivotally connected at an upper end to the upper portion of the main shock absorber strut and pivotally connected at a lower end to the first one of said units, and a third one of said units pivotally connected at a lower end to the bogie beam at an auxiliary pivot and connected at an upper end to the lever, the positioning unit assuming one of a contracted state or extended state for taxiing, take-off and landing, and the other of the contracted or extended state for stowing the landing gear after take-off, and the spring unit providing spring resistance to pivotal movements of the bogie beam about the main pivot during taxiing.

According to a fourth aspect of the invention, a semi-levered landing gear for an aircraft comprises: a main shock absorber strut with upper and lower telescoping portions, with the upper portion connectable to the airframe; a bogie beam to extend fore and aft of the airframe with at least one forward axle and one aft axle for respective forward and aft wheels and a main pivot between the forward and aft axle pivotally connected to the lower portion of the main shock absorber strut; and an auxiliary actuator mechanism comprising a lever pivotally connected to the upper portion of the main shock absorber strut so as to pivot between a predetermined lower position for take-off and landing and an upper position, a spring unit pivotally connected at an upper end to the upper portion of the main shock absorber strut and pivotally connected at a lower end to the lever, and a positioning unit pivotally connected at a lower end to the bogie beam at an auxiliary pivot and connected at an upper end to the lever, the positioning unit assuming a contracted state for taxiing, take-off and landing, and an extended state for stowing the landing gear after take-off, the positioning unit transferring to the lever and to the spring unit, pivotal movements of the bogie beam about the main pivot during taxiing, and the positioning unit and lever restraining the bogie beam to tilt about the auxiliary pivot and to lengthen the landing gear during take-off.

According to a fifth aspect of the invention, semi-levered landing gear comprises a main shock absorber strut with upper and lower telescoping portions, with the upper portion connectable to the airframe; a bogie beam to extend fore and aft of the aircraft fuselage with at least one forward axle and one aft axle for respective forward and aft wheels and a main pivot between the forward and aft axle pivotally connected to the lower portion of the main shock absorber strut; and an auxiliary actuator mechanism comprising a lever pivotally connected to the upper portion of the main shock absorber strut so as to pivot between a predetermined upper position for take-off, and a lower position, a spring unit pivotally connected at an upper end to the lever and at a lower end to an auxiliary pivot forward of the main pivot, and a control linkage connected between the lever and the upper portion of the main shock absorber strut to define said upper predetermined position of the lever, the control linkage being connectable to an anchor point that moves relative to the upper portion of the main shock absorber strut during stowing, whereby the control linkage is operated by initial stowing movement of the stowing mechanism to lower the lever from said upper position to a stowing position.

According to a sixth aspect of the invention, a semi-levered landing gear comprises: a main shock absorber strut with upper and lower telescoping portions, with the upper portion pivotally connectable to the airframe; a bogie beam to extend fore and aft of the airframe with at least one forward axle and one aft axle for respective forward and aft wheels and a main pivot between the forward and aft axle pivotally connected to the lower portion of the main shock absorber strut; and an auxiliary actuator mechanism comprising a spring unit pivotally connected at a lower end to an auxiliary pivot on the bogie forward of the main pivot, and at an upper end to an anchor point offset from the pivot connection of the upper portion to the aircraft fuselage so that during stowing both the strut and spring unit pivot together about different pivot points, which causes a relative longitudinal movement between the main pivot and auxiliary pivot that further tilts the bogie beam to a stowing position.

DESCRIPTION OF THE DRAWINGS

The invention will now be described by way of example with reference to the accompanying drawings in which.

DETAILED DESCRIPTION

Figure 1:
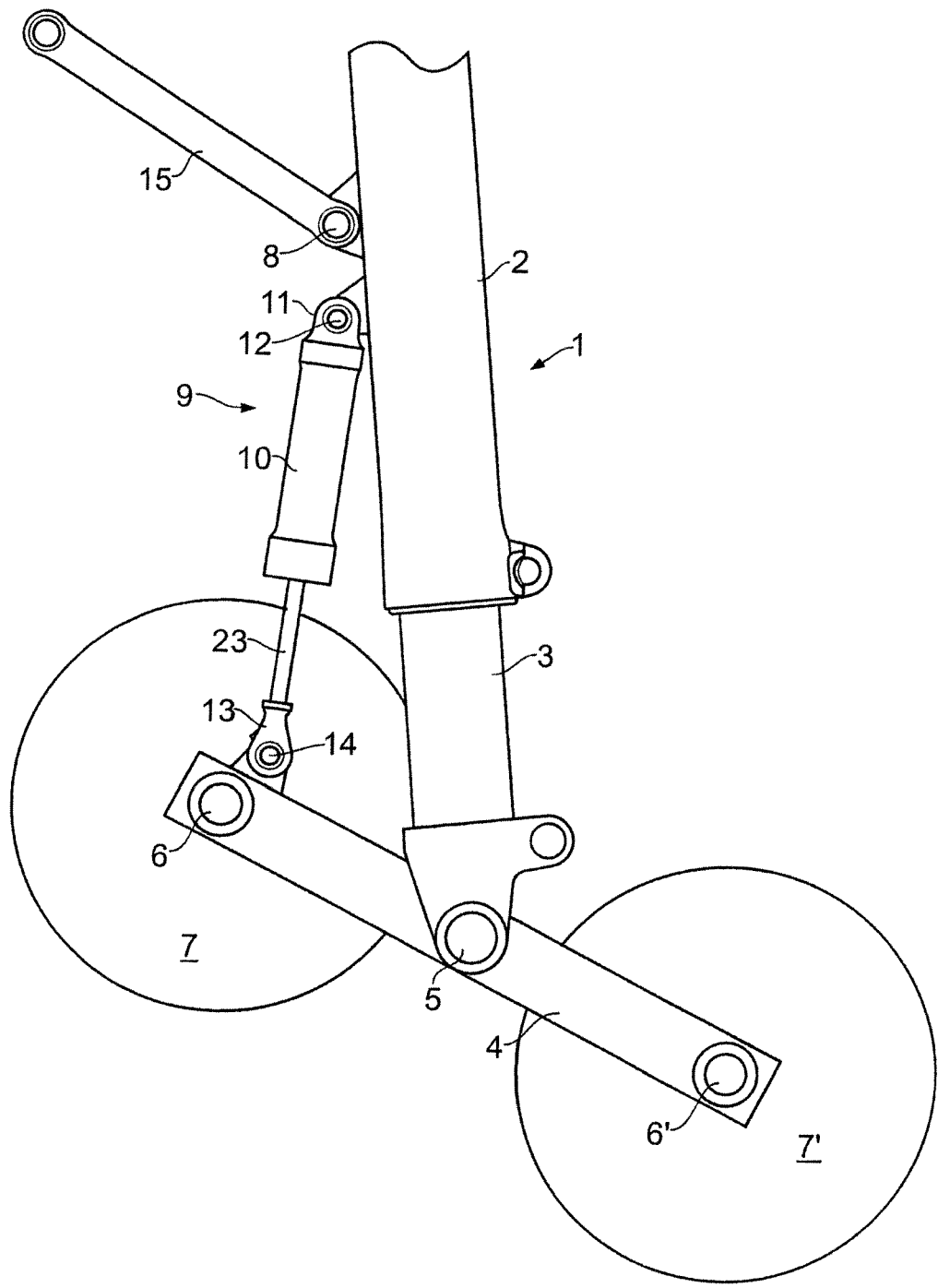
FIG. 1 is a schematic drawing of a semi-levered landing gear for an aircraft according to a first embodiment of the invention.

The landing gear illustrated in FIG. 1 comprises a main hydraulic shock absorber strut 1 comprising an upper portion 2 connectable to the underside of an aircraft at its upper end, and a lower portion 3 which telescopes within the upper portion 2 during take-off and landing. A bogie beam 4 extends fore and aft of the aircraft and is pivotally connected to the bottom of the lower portion 3 by a main pivot 5 in the mid-region of the bogie beam 4. Axles 6, 6.sup.1 are mounted at each end of the bogie beam 4 and carry wheels 7, 7.sup.1. An auxiliary actuator 9 is connected between the upper portion 2 of the main strut and the forward section of the bogie beam 4 to control the angular position of the bogie beam during taxiing, take-off and landing. The auxiliary actuator comprises an outer cylinder casing 10 with a closed upper end carrying an upper connector 11 which is pivotally connected at 12 to the upper end 2 of the main strut. A first piston rod 23 extends from the lower end of the cylinder casing 10 and carries a lower connector 13 which is pivotally connected at 14 to the front end of the bogie beam between the axle 6 and the main pivot 5. A side stay 15 is connected between the upper portion 2 of the shock absorber strut and the aircraft, and moves with the strut when the landing gear is moved to a stowed position in the aircraft by a stowing actuator.

Figure 2:
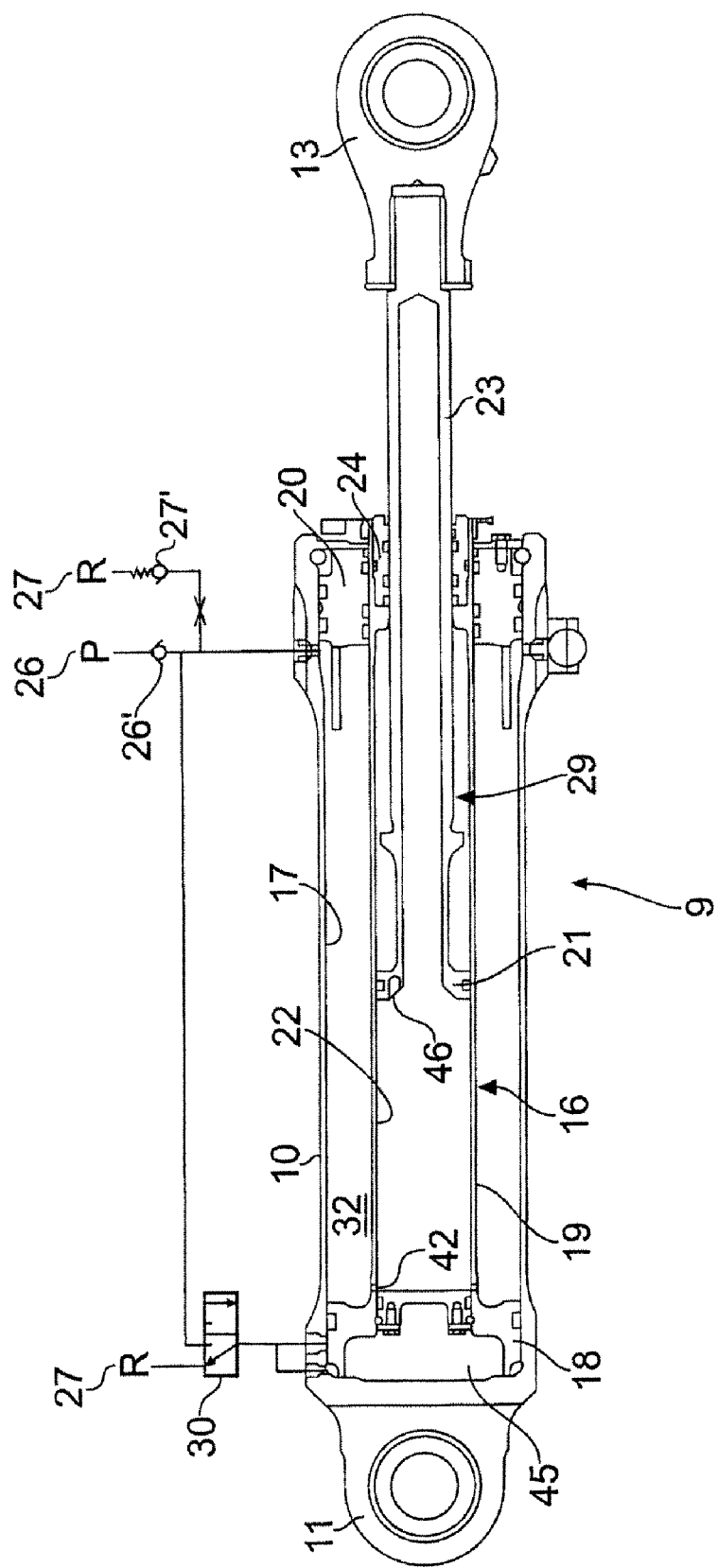
FIG. 2 is a section through the auxiliary actuator in FIG. 1.

The auxiliary actuator 9 comprises a two-stage telescopic hydraulic unit, as shown in FIG. 2, comprising the outer casing 10 with a closed upper end and an open lower end. The two stages of the hydraulic unit comprise a second stage floating piston 16 which slides within a bore 17 of the casing 10, and a first stage spring/damping piston 29 slidable within the floating piston 16. The floating piston 16 has a piston head 18 that seals within the bore 17 and co-operates with the closed upper end of the casing 10 to define a head space 45, and a tubular rod portion 19 that extends from the piston head 18 through a gland 20 in the open end of the casing 10 and defines an annular chamber 32. The spring/damping piston 29 comprises a piston head 21 that seals within the bore 22 of the rod portion 19, and a rod portion 23 that extends from the piston head 21 through a gland 24 in the open end of the rod portion 19. The rod portion 23 extends externally of the casing 10 and carries the lower connector 13 at its outer end. The piston head 21 incorporates flow restrictor apertures 46 that connect both sides of the piston head 21 within the bore 22 of the rod portion 19, and apertures 42 in the wall of the piston rod 19 near the piston head that connect the bore 22 permanently to the annular chamber 32.

The hydraulic control circuit of the auxiliary actuator is shown in simplified form in FIG. 2 and comprises a hydraulic selector valve 30 that controls connection of a hydraulic pressure supply 26 and hydraulic return 27 to the actuator. The pressure supply 26 is connected via a non-return valve 26', and a pressure relief valve 27' is provided in the return connection on the piston rod side of the floating piston 16. The circuit is shown in more detail in FIG. 3. The hydraulic control circuit is housed in a manifold 25 mounted on the outer surface of the casing 10. A hydraulic pressure supply 26 and a hydraulic return 27 in the aircraft are connected to the manifold 25, the broken line 28 representing the interface between the manifold and the aircraft.

Figure 3:
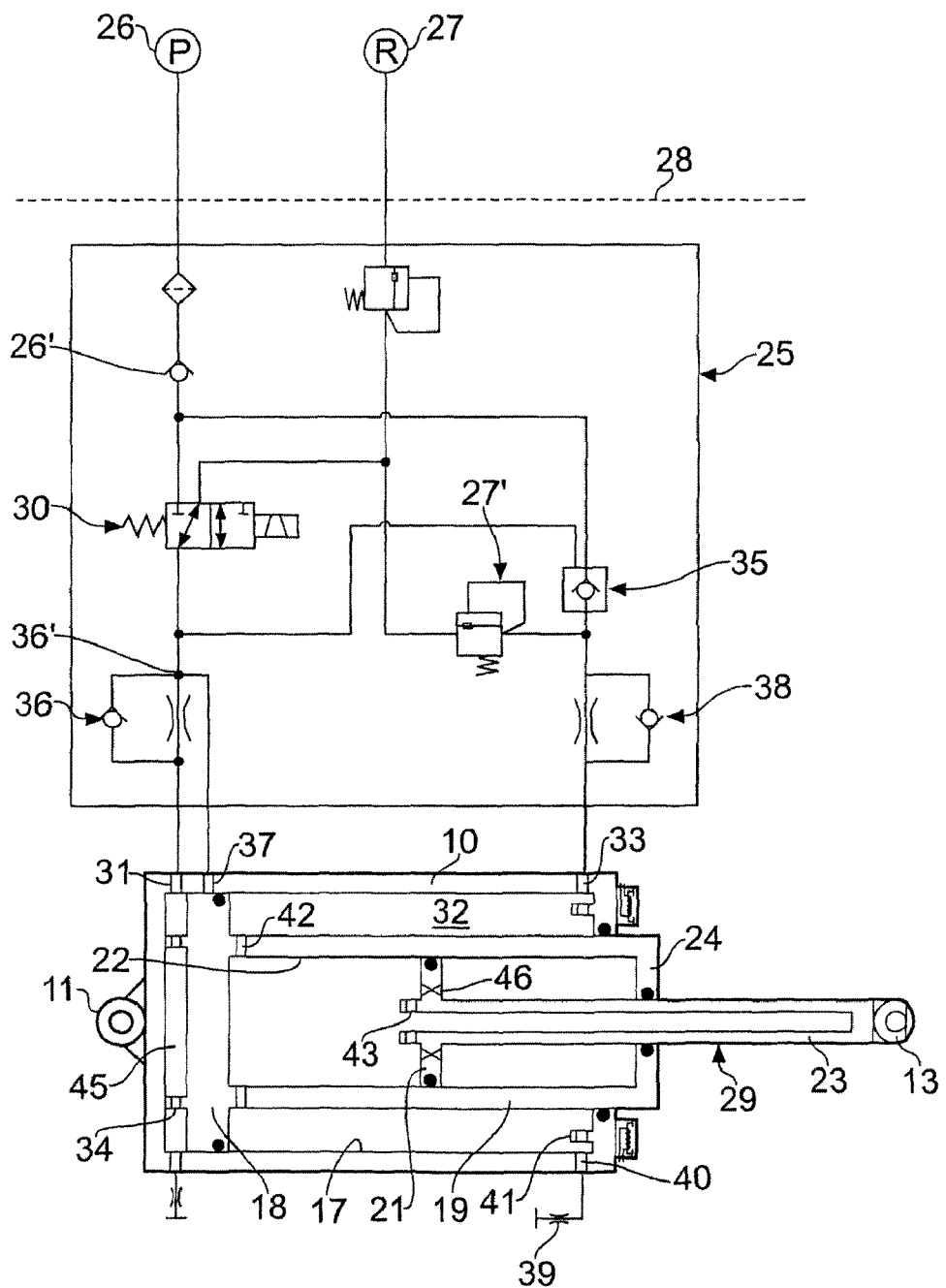
FIG. 3 is a schematic drawing of the auxiliary actuator of FIG. 1 and shows the hydraulic control circuit in more detail.

The hydraulic control circuit comprises an electrically operated, two position, three port selector valve 30 which has two operating states: a Retract/Lock state for taxiing, take-off and landing, and an Extend state for stowing of the landing gear after take-off. The selector valve 30 is spring bias to the Retracts/Lock state as shown in FIG. 3, this being the fail-safe condition. In the Retract/Lock state, the selector valve 30 connects the hydraulic return line 27 to an aperture 31 in the casing 10 which communicates with the head space 45 of the floating piston 16. The annular chamber 32 surrounding the tubular rod portion 19 of the floating piston 16 is permanently connected to the pressure supply 26 via an aperture 33 in casing 10 and the control circuit. Therefore, supply pressure in the annular chamber 32 forces the floating piston 16 to the retracted position in which an end stop 34 on the piston head 18 engages the closed end of the casing 10. A piloted check valve 35 in the control circuit serves to lock hydraulic pressure in the annular chamber 32, thus preventing extension of the floating piston 16 during taxiing, take-off and landing.

A uni-directional snubbing restrictor 36 is also provided in the control circuit, which is connected to aperture 31 and a further aperture 37 in the casing 10, closely spaced axially from the aperture 31, so as to be closed by the piston head 18 near the fully reacted position, thereby restricting fluid flow in the restrictor 36 and limiting the impact load of the end stop 34 against the closed end of the casing 10.

During taxiing, the spring/damping piston 29 assumes an intermediate position within the piston rod 19 of the floating piston 16 and moves axially to accommodate minor pivoting movements of the bogie as it engages bumps or dips in the runway. The flow of hydraulic fluid through the restrictor apertures 46 in the piston head 21 controls a damping action.

End stops 43 on the piston head 21 co-operates with the adjacent face of the piston head 18 so as to define a retracted position for the spring/damping piston. In the extended position, the opposite face of the piston head 21 engages the gland 24 that closes the open end of the tubular rod portion 19.

During take-off, tension is applied to the auxiliary actuator 9 as a consequence of the loading applied to the bogie beam from the main shock absorber strut and the aft wheels in contact with the ground. As a result, the spring/damping piston 29 extends fully to the extended position shown in FIG. 4, in which the auxiliary actuator 9 has a predetermined intermediate length, and the lower connection point 14 at the front of the bogie beam 4 is restrained in height and the bogie beam tilts downwards towards its rear end as the main strut 1 continues to extend. The extended position is defined by engagement of the piston head 21 with the gland 24 at the lower end of the piston rod 19. After take-off the spring/damping piston 29 remains in the extended position because of the internal hydraulic pressure.

Figure 5:
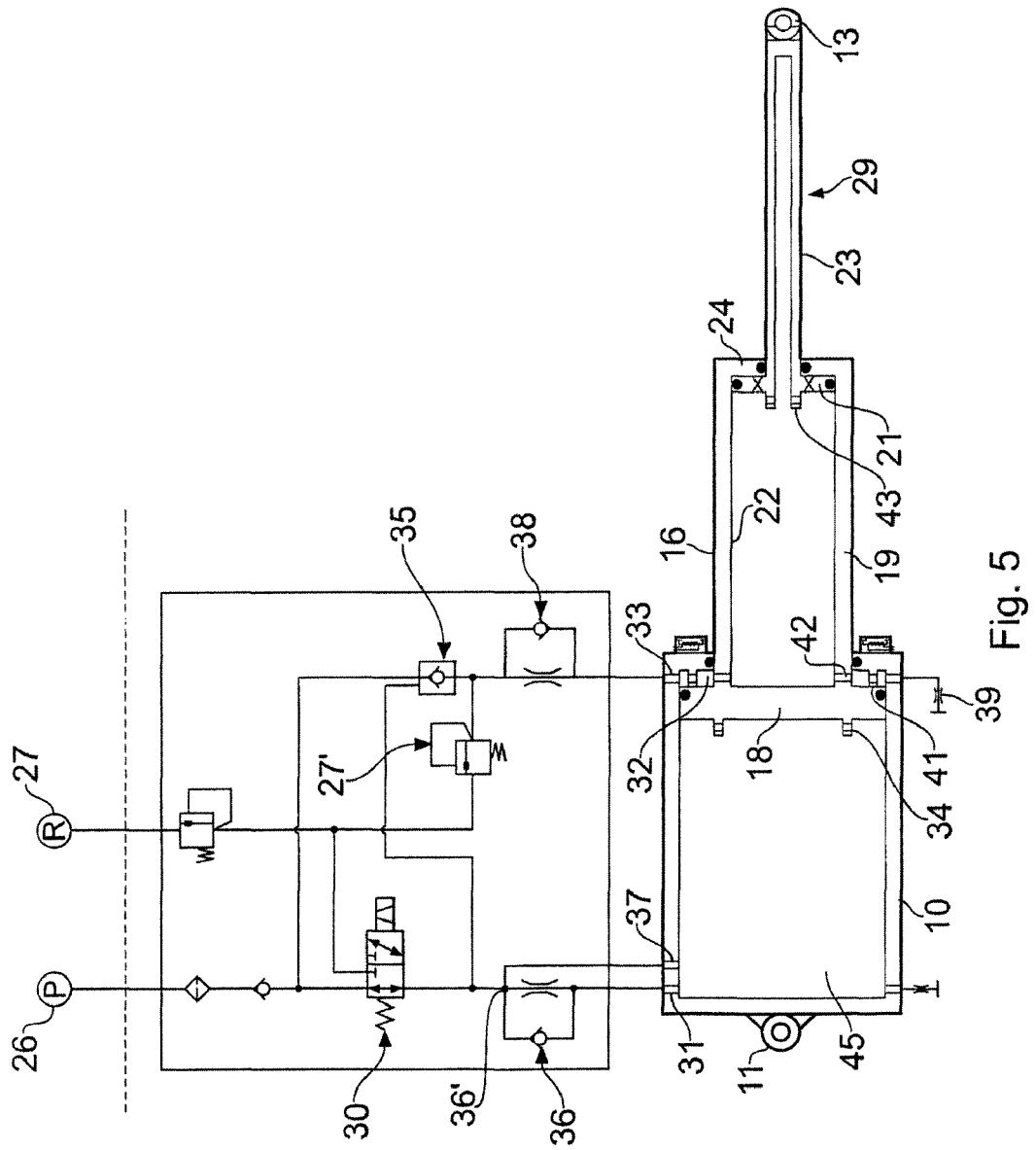
FIG. 5 is a schematic drawing similar to FIG. 3 with the auxiliary actuator in a maximum extended state.

Following take-off, the landing gear stowing sequence is initiated, and the selector valve 30 is energised and changes over to the Extend state as shown in FIG. 5. The selector valve 30 now connects the pressure supply 26 to the head space 45 of the casing 10 via the apertures 31 and 37. The differential area of the piston head 18 causes a net force to extend the floating piston 16 as shown in FIG. 5. As the floating piston extends, hydraulic fluid is recirculated from the annular chamber 32 to the head space 45 through the piloted check valve 35, the piloted check valve 35 being opened by the output pressure from the selector valve 30 when it switches to the Extend state. A unidirectional rate restrictor 38 in the control circuit serves to control the speed with which the floating piston 16 extends to suit the performance requirement for stowing the landing gear. As the floating piston 16 extends, additional hydraulic fluid is drawn into the system from the pressure supply, equivalent to the volume of the tubular piston rod 19 displaced from the casing 10. The extended position of the floating piston 16 is determined by an end stop 41 with which the piston head 18 engages leaving the aperture 33 open. As the floating piston 16 extends, the hydraulic pressure within the annular chamber 32 serves as a spring to hold the spring/damping piston 29 in the extended position in contact with the gland 24.

When the auxiliary actuator 9 is fully extended, as shown in FIG. 5, it assumes a maximum length and serves to tilt the bogie beam 4 about the main pivot 5 to a more horizontal configuration necessary for the landing gear to be stowed in the aircraft. The stowing actuator operates to move the landing gear to the stowed position.

The selector valve 30 may be energised continually during cruising of the aircraft, but it could alternatively be periodically energised to recharge the actuator.

Figure 4:
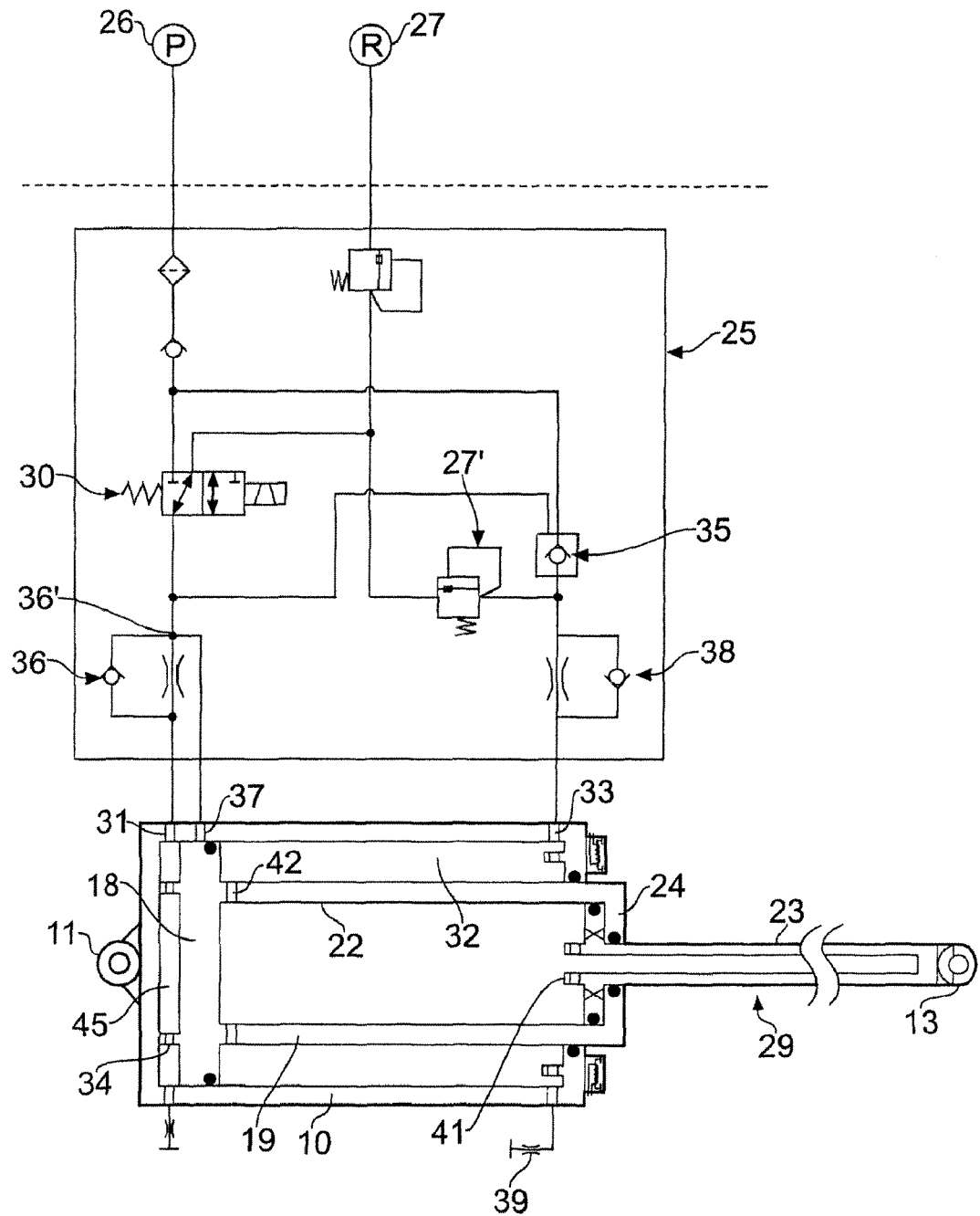
FIG. 4 is a schematic drawing similar to FIG. 3 with the auxiliary actuator in an intermediate extended state.

In preparing for landing, the landing gear is deployed and then the selector valve 30 is de-energised and returns to the Retract/Lock state, in which it connects the head space 45 in bore 17 to the return line 27, as shown in FIG. 4. The floating piston 16 retracts as hydraulic fluid is expelled to the return line 27. A rate restrictor can be provided to reduce the rate of retraction of the floating piston. The uni-directional snubbing restrictor 36 serves to decelerate the floating piston 16 at the end of its retract operation. The uni-directional snubbing restrictor 36 also serves to restrict recoil if a tension load separates the piston head 18 from the end of the casing 10 after aircraft rotation during take-off.

It should be noted that if there is a loss of hydraulic power in the Retract/Lock state, the hydraulic control circuit will lock pressure in the annular chamber 32 of the auxiliary actuator 9 by means of the piloted check valve 35, and the landing gear will function more or less normally during take-off and landing. Furthermore, a loss of electrical power in the Retract/Lock state will not effect operation of the auxiliary actuator during take-off and landing.

In the event of a loss of hydraulic power in the Extend state, a low pressure relief valve 39 connected to the lower end of the annular chamber 32 via an aperture 40 will maintain a level of hydraulic pressure sufficient to maintain the bogie in the stowed position. A loss of electrical power will have the same effect if the valve 30 is provided with a detent. Therefore, in the event of the loss of either hydraulic pressure or electrical power, the auxiliary actuator 9 will remain extended and the aircraft will land with the landing gear in this state.

The manifold 25, which incorporates the hydraulic control circuit, is preferably connected to the outer casing 10 at its lower end so that there is a direct communication with the aperture 33 connected to the annular chamber 32. Pressure and return pipelines then run down the outside of the casing from the aircraft to the manifold. The snubbing valve assembly 36 may be incorporated in the casing 10 so that there is a single outlet connection 36' which is connected via an additional transfer pipe to the manifold. This configuration protects the connection between the aperture 33 and the manifold and ensures that the auxiliary actuator 9 will continue to operate during take-off, even if pressure or return pipes or the transfer pipe are severed.

In a variation of the invention, the hydraulic control circuit shown in FIGS. 2 to 5 is adapted so that the selector valve 30 controls connection of the pressure supply 26 or return source 27 to the annular space 32 on the piston rod side of the floating piston 16, the head space 45 in the casing 10 is permanently connected to the return source 27. The auxiliary actuator 9 then operates so as to assume the retracted state when the selector valve 30 connects pressure to the annular space 32, and assumed the extended state when the selector valve 30 connects return to the annular space 32.

Figure 6:
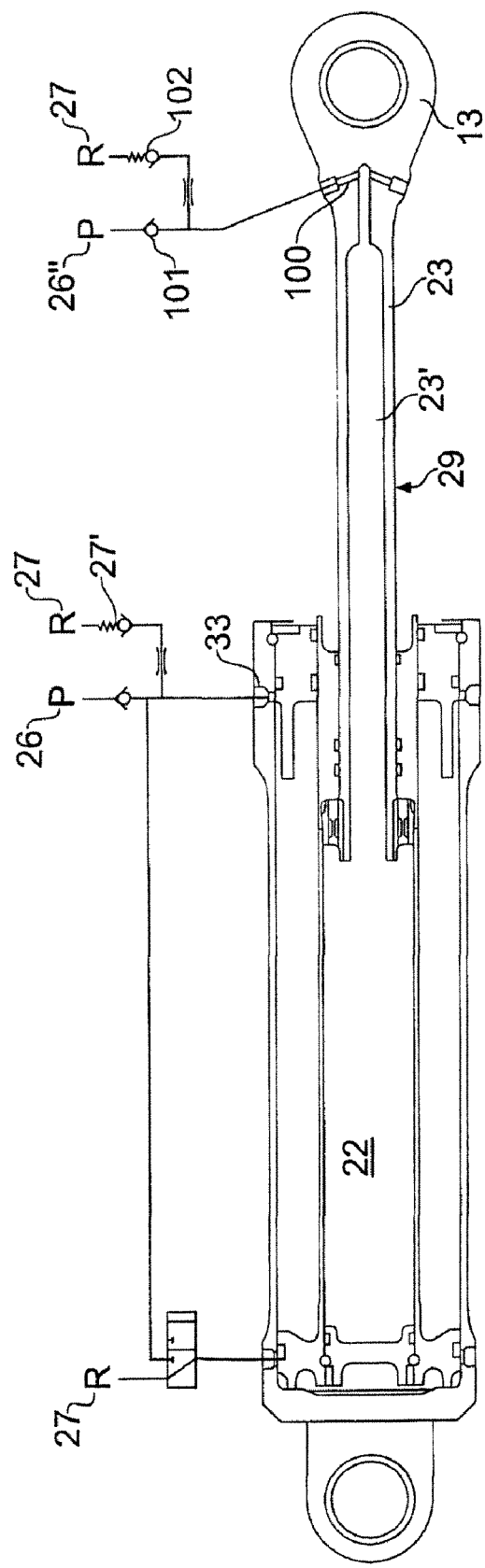
FIG. 6 is a section through an auxiliary actuator similar to that of FIG. 2 except that a hydraulic connection is made via the lower piston rod.

Another variation of the invention is shown in FIG. 6 which is similar to that of FIGS. 1 to 5 except that the pressure supply connection to the bore 22 of the spring floating piston 16 is not made via an aperture 42 in the second piston rod 19, but instead is made via a bore 23' in the first piston rod 23 and an aperture 100 in the lower connector 13. A pressure supply 26" is connected to the aperture 100 via a non-return valve 101, and a pressure relief valve 102 is provided to allow for volume changes in the system. The pressure supply 26" can be independent of the pressure supply 26, and the pressure relief valve 102 can be set at a lower relief setting than the pressure relief valve 27' in the connection to the aperture 33 in the outer casing 10.

Figure 7:
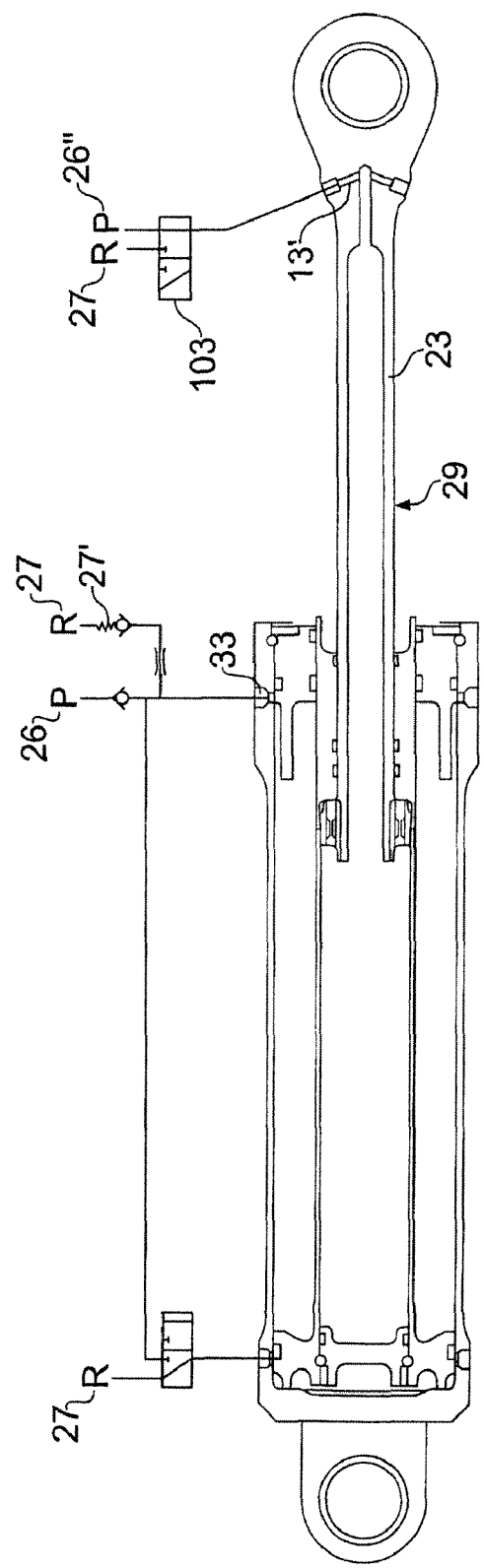
FIG. 7 is a section through an auxiliary actuator similar to that of FIG. 6, but with modified hydraulic control circuitry.

Another variation similar to that of FIG. 6 is shown in FIG. 7, in which the non-return valve 101, and pressure relief valve 102 arrangement is replaced by a solenoid operated valve 103. This arrangement allows selection of different pressure to the piston rod 23 when the aircraft is on the ground.

Figure 8:
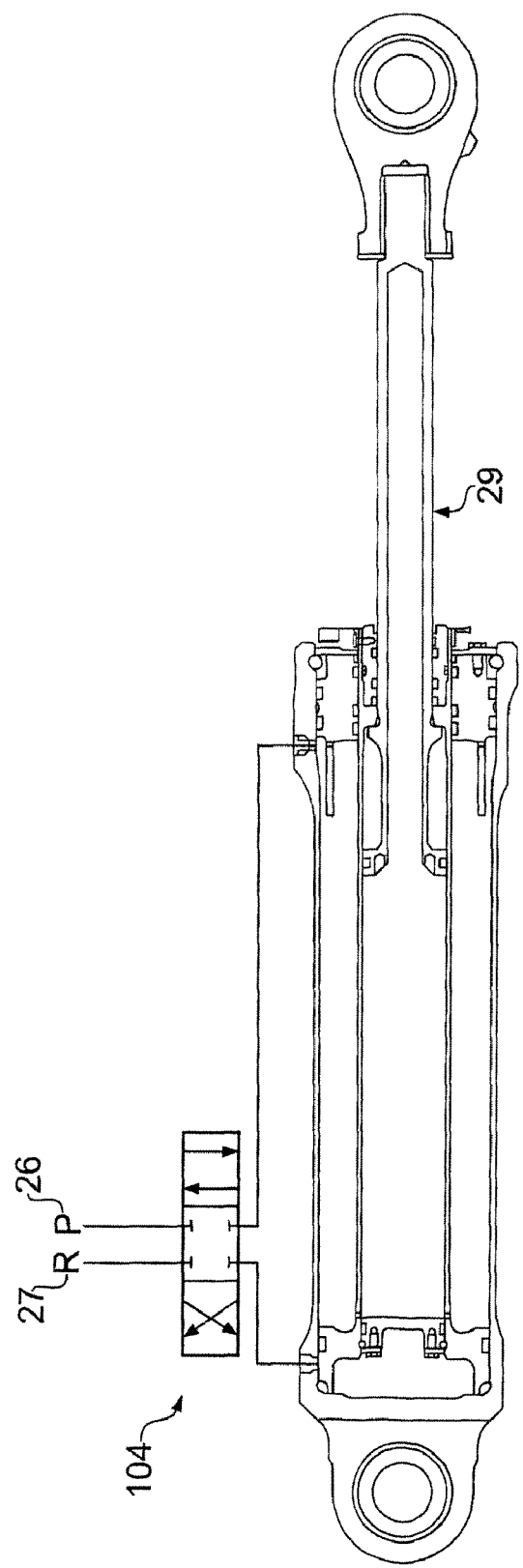
FIG. 8 is a section through an auxiliary actuator similar to that of FIG. 6, but with modified hydraulic control circuitry to that of FIGS. 6 and 7.

Another variation of the invention is shown in FIG. 8, similar to that of FIGS. 1 to 5, in which the selector valve 30 is replaced by a solenoid operated three position, four port selector valve 104 which has a middle position in which it positively locks the pressure in the auxiliary actuator 9 and has a Retract/Lock position on one side and an Extend position on the other side. The selector valve 104 is incorporated in a servo-control system including a feedback sensor responsive to the position of the bogie beam. The sensor may comprise a switch mounted on the bogie beam to operate when a predetermined position is reached and to cause the selector valve 104, to move to the middle position, the system then operating as a "bang-bang" system, alternatively, a full servo-control system may be provided in which the sensor comprises an LVDT or RVDT sensor producing a control signal in a logic with a control output to the selector valve 104.

Figure 9:
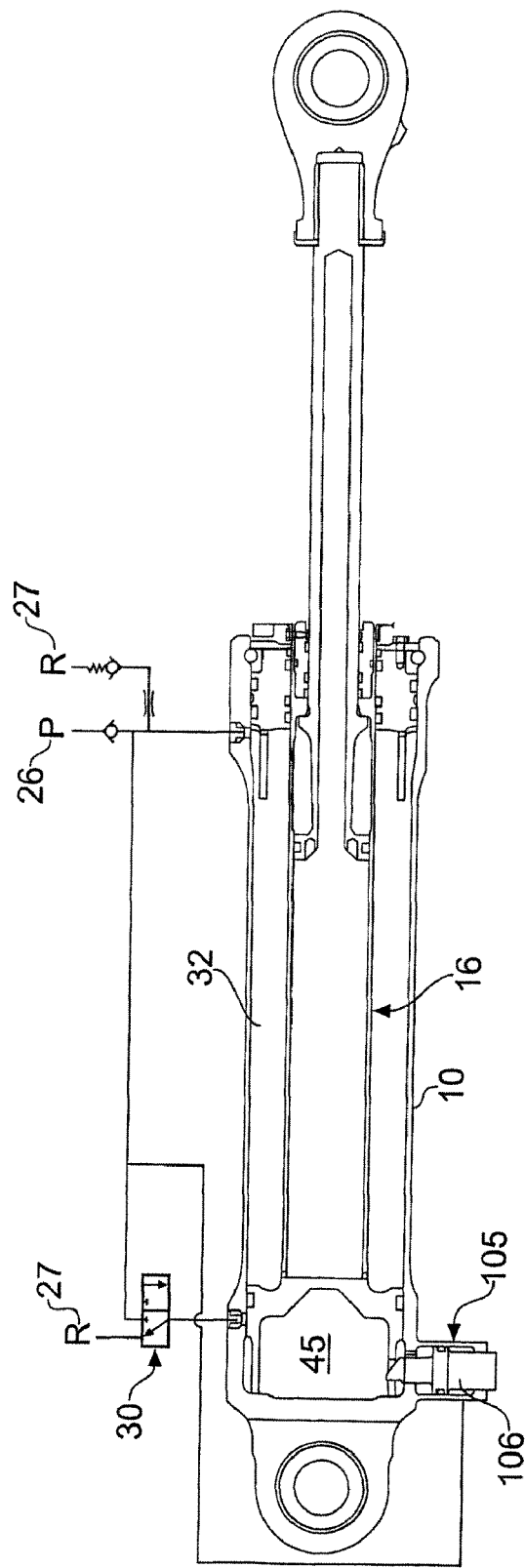
FIG. 9 is a section through an auxiliary actuator similar to that of FIG. 6, but incorporating a hydraulically operated mechanical lock for the floating piston.

Another variation of the invention is shown in FIG. 9, which is similar to that of FIGS. 1 to 5, but includes a mechanical lock 105 to hold the floating piston in the Retract/Lock state as shown in FIG. 9. The lock 105 in FIG. 9 is a hydraulic plunger lock which is mounted in the casing 10 to cooperate radially with the floating piston 16. The plunger 106 on one side of the lock 105 is exposed to hydraulic pressure at the head end 45 of the piston 16, and the plunger on the other side of the lock is connected to the pressure supply 26 so that the pressure supply activates the lock when the selector valve 30 connects the head end of the piston 16 to the return 27, and the lock is deactivated when the selector valve 30 connects the head end of the piston 16 to the pressure supply 26 by virtue of the differential area of the plunger 106. The hydraulic connections can be rearranged to connect the pressure supply 26 permanently to the head end and to use the selector valve 30 to switch either the pressure supply 26 or return 27 to the piston rod side 32 of the floating piston 16, the lock 105 being deactivated provided the acting pressure both sides of the plunger 106 are equalised. In other embodiments of the invention, the lock 105 could be a claw lock or a segment lock instead of a plunger lock.

Figure 10:
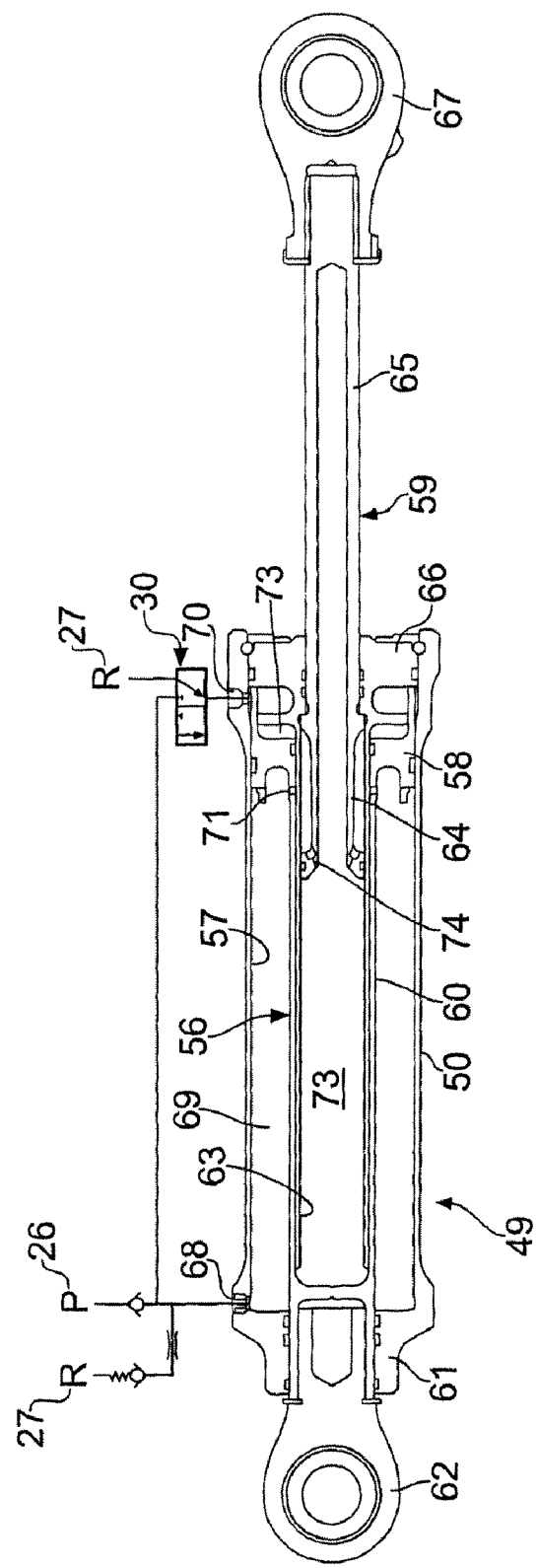
FIG. 10 is a section through an auxiliary actuator according to a second embodiment of the invention with the actuator in an extended state.

In another embodiment of the invention, an auxiliary actuator 49, illustrated in FIG. 10, replaces the auxiliary actuator 9 shown in FIG. 1. The auxiliary actuator 49 is similar to that of FIG. 2 in that it comprises a two-stage, telescopic hydraulic unit with an outer casing 50, a second stage piston 56 which slides within a bore 57 in the casing 50, and a first stage spring/damping piston 59 slidable coaxially with the second piston 56. The second piston 56 has a piston head 58 that seals with the bore 57 and a tubular piston rod 60 which extends from the piston head 58 through a gland 61 in the upper end of the casing 50 and carries a connector 62 at its outer end externally of the casing 50. The first stage spring/damping actuator 59 comprises a sleeve 63 on which said tubular piston rod 60 slides and seals coaxially, and a first piston head 64 slidable within the sleeve 63 and having a first piston rod 65 that extends from the first piston head 64 through a gland 66 in the lower end of the casing 50. The gland 66 supports both the first piston rod 65 and the lower end of the sleeve 63. The lower end of the first piston rod 65 carries a lower connector 67 at its outer end externally of the casing 50.

The auxiliary actuator 49 in FIG. 10 is therefore a two-stage actuator with piston rods at both ends, the piston rod 65 of the first stage extending downwards and the piston rod 60 of the second stage extending upwards.

Figure 11:
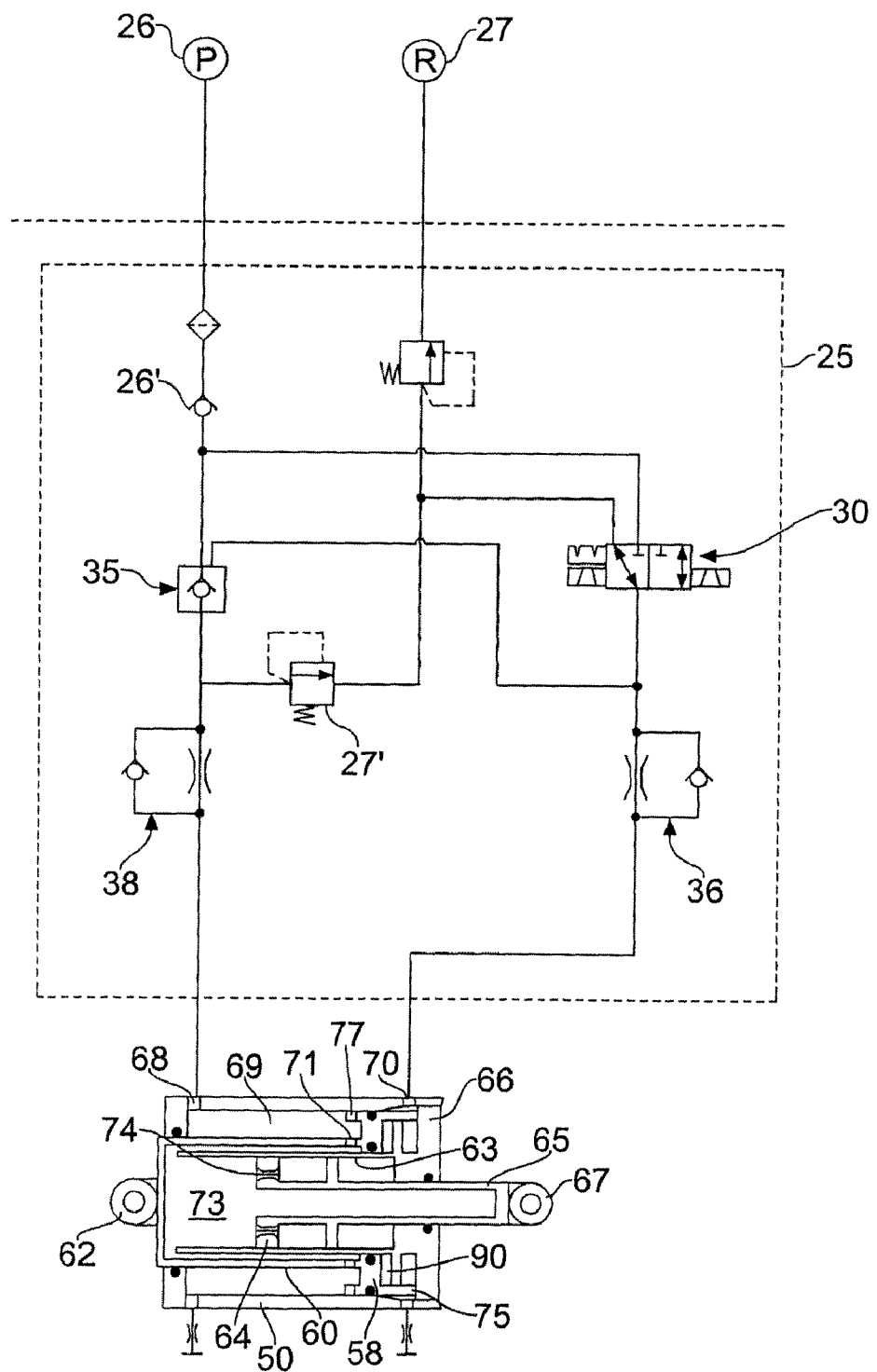
FIG. 11 is a section through the auxiliary actuator of FIG. 10 in a partially retracted state and shows the hydraulic control circuit in more detail.
Figure 12:
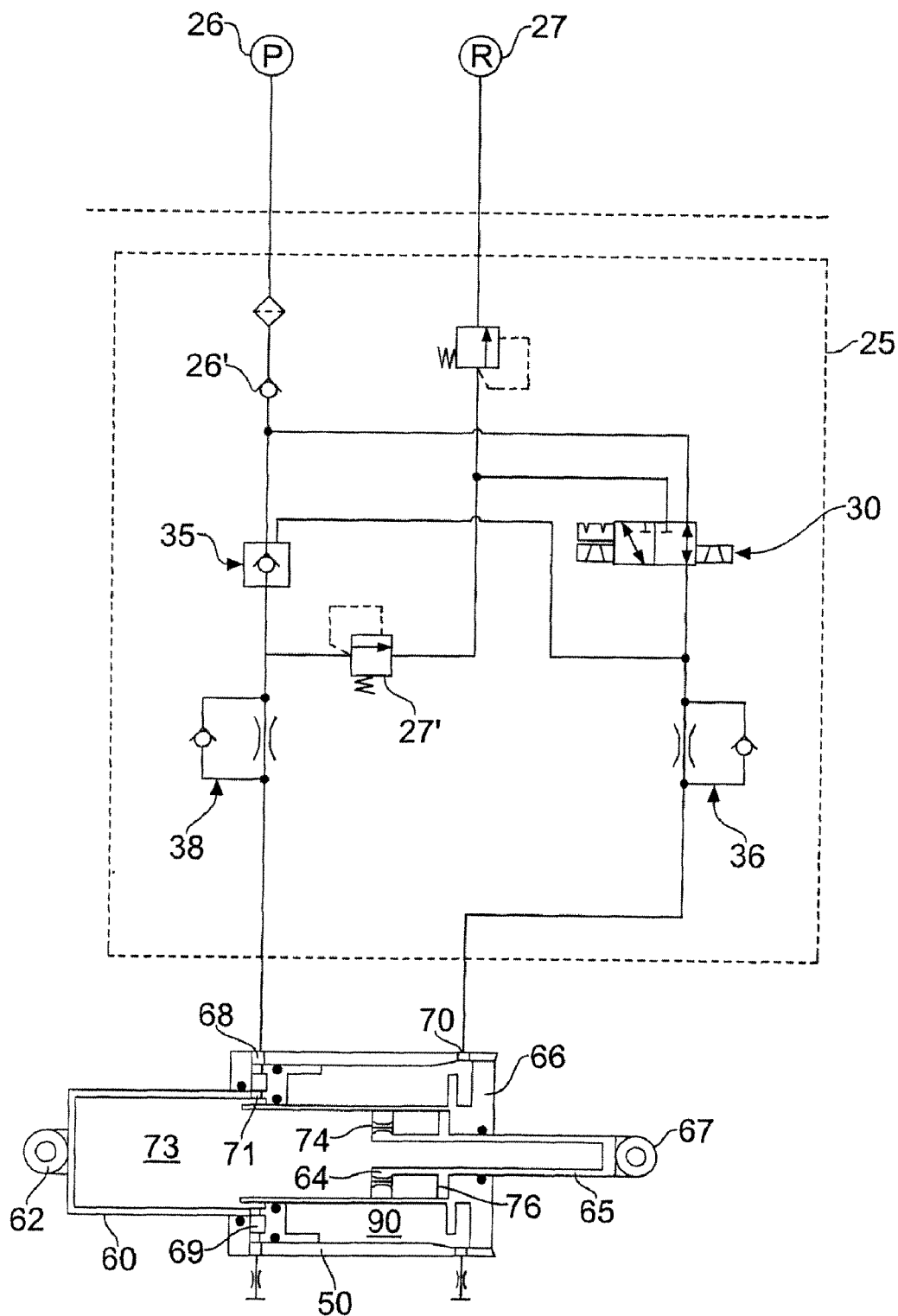
FIG. 12 is a section similar to FIG. 11, but shows the auxiliary actuator of in a fully extended state.

A hydraulic control circuit similar to that illustrated in FIG. 3 may be used in the embodiment of FIG. 10, but the hydraulic connections to the auxiliary actuator 49 need to be adapted to suit the double piston rod configuration. The permanent connection to the pressure supply 26 is connected via an aperture 68 in the upper end of the casing 50 to the annular chamber 69 surrounding the tubular piston rod 60, and the switchable pressure/return connection from the selector valve 30 is connected via an aperture 70 in the casing 50 to a head space 73 between the piston head 58 and the gland 66. Internal aperture 71 in the tubular piston rod 60 serve to connect the outer annular chamber 69 to the head space 73 within the sleeve 63, and flow restrictor apertures 74 in the first piston head 64 allow hydraulic fluid to flow from one side of the head to the other to produce a damping action. The details of the hydraulic control circuit are shown in FIGS. 11 and 12, in which the same reference numbers are used from FIGS. 3 to 6 for equivalent hydraulic components. The hydraulic control circuit is similar, but one is a mirror image of the other.

It will be appreciated that the modifications to the hydraulic control circuit shown in FIGS. 6 to 9 can each be applied to the embodiment of FIGS. 10 to 12 in a similar manner as shown applied to the embodiment of FIGS. 1 to 5.

It will be appreciated that the auxiliary actuator as illustrated in FIGS. 1 to 12 could equally well be installed in the landing gear assembly of FIG. 1 in an inverted configuration with the upper connector 11 or 62 connected at 14 to the front of the bogie, and with the lower connector 13 or 67 connected at 12 to the upper end 2 of the main strut.

When the selector valve 30 connects the head space 90 to the return source 27, the second stage floating piston 56 and piston rod 60 are retracted, as shown in FIGS. 10 and 11 and end stops 75 on the piston head 58 engage the gland 66. The first piston 59 can then operate to provide a damping function during taxiing, or can extend to the extended position shown in FIG. 12 during take-off, the extended position being defined by end stops 76 which engage the gland 66. After take-off, the selector valve 30 is switched to the Extend state to connect pressure 26 to the head space 73, and the differential area of the floating piston 56 will cause it to extend to the extended position shown in FIG. 12 in which end stops 77 engage the gland 61. In this maximum extended position, the bogie is positioned for stowing. The operation of the piloted check valve 35, the unidirectional snubbing restrictor 36 and the unidirectional rate restrictor 38 are all the same as described in relation to the embodiment of FIGS. 2 to 5.

The manifold 25 incorporating the hydraulic control circuit is preferably mounted on the outer casing 50 at the top of the auxiliary actuator so as to interface directly with the aperture 68, and there is then only one transfer pipe to connect the manifold to the aperture 70 at the lower end of the casing 50.

Figure 13:
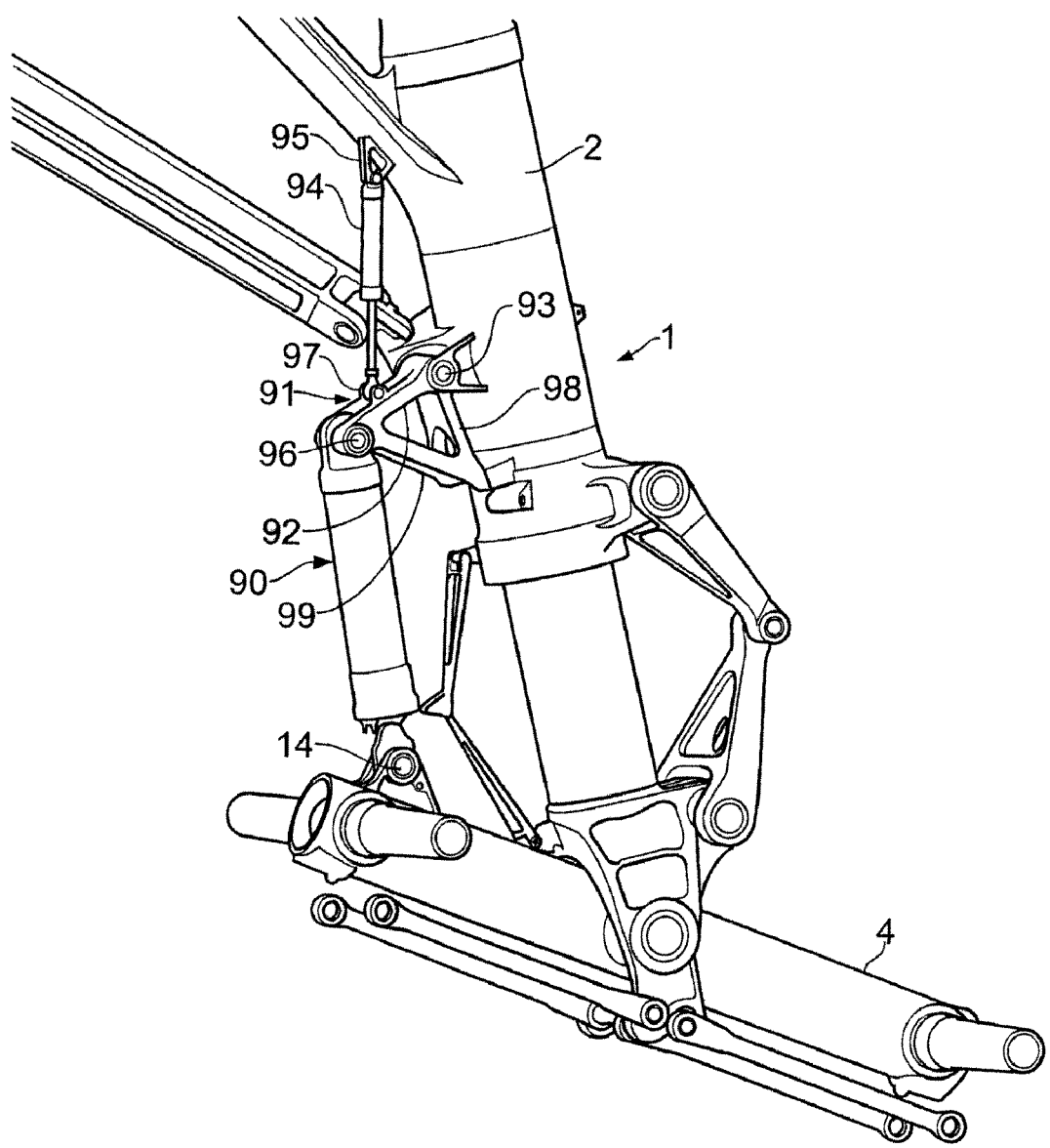
FIG. 13 is an auxiliary actuator mechanism to a third embodiment of the invention.

In another embodiment of the invention, the two-stage telescopic hydraulic actuator 9 in FIG. 1 is replaced by an actuator mechanism incorporating a spring/damping unit and a bogie positioning unit as separate units operating in tandem. As illustrated in FIG. 13, the positioning unit comprises a hydraulic actuator 90 connected between connection point 14 on the bogie beam 4 and a swinging link 91 pivotally connected to the upper portion 2 of the main strut 1 at a pivot point 93. The spring/damping unit comprises a hydraulic spring damper 94 connected between the swinging link 91 and the upper portion of the main strut 1 at a pivot point 95 above the pivot point 93. The swinging link 91 comprises a lever arm 92 which is connected to the pivot 93 at one end and is connected at its other end to the upper end of the positioning actuator 90 at a pivot 96. The spring/damper 94 is connected at its lower end to an intermediate point 97 of the lever arm 92. Furthermore, the swinging link 91 comprises respective abutment arms 98, 99 which extend downwards from each end of the lever arm 92 and are joined at their lower ends. The abutment arm 98 is designed to abut the upper portion 2 of the main strut, as shown in FIG. 13, during take-off and landing. Tension in the positioning actuator 90 creates a turning moment on the swinging link 91 which forces the abutment arm 98 against the strut 1. The positioning actuator 90 is shown in its retracted state, and the bogie beam 4 tilts downwards about the pivot 14 at the lower end of the positioning actuator.

Figure 14:
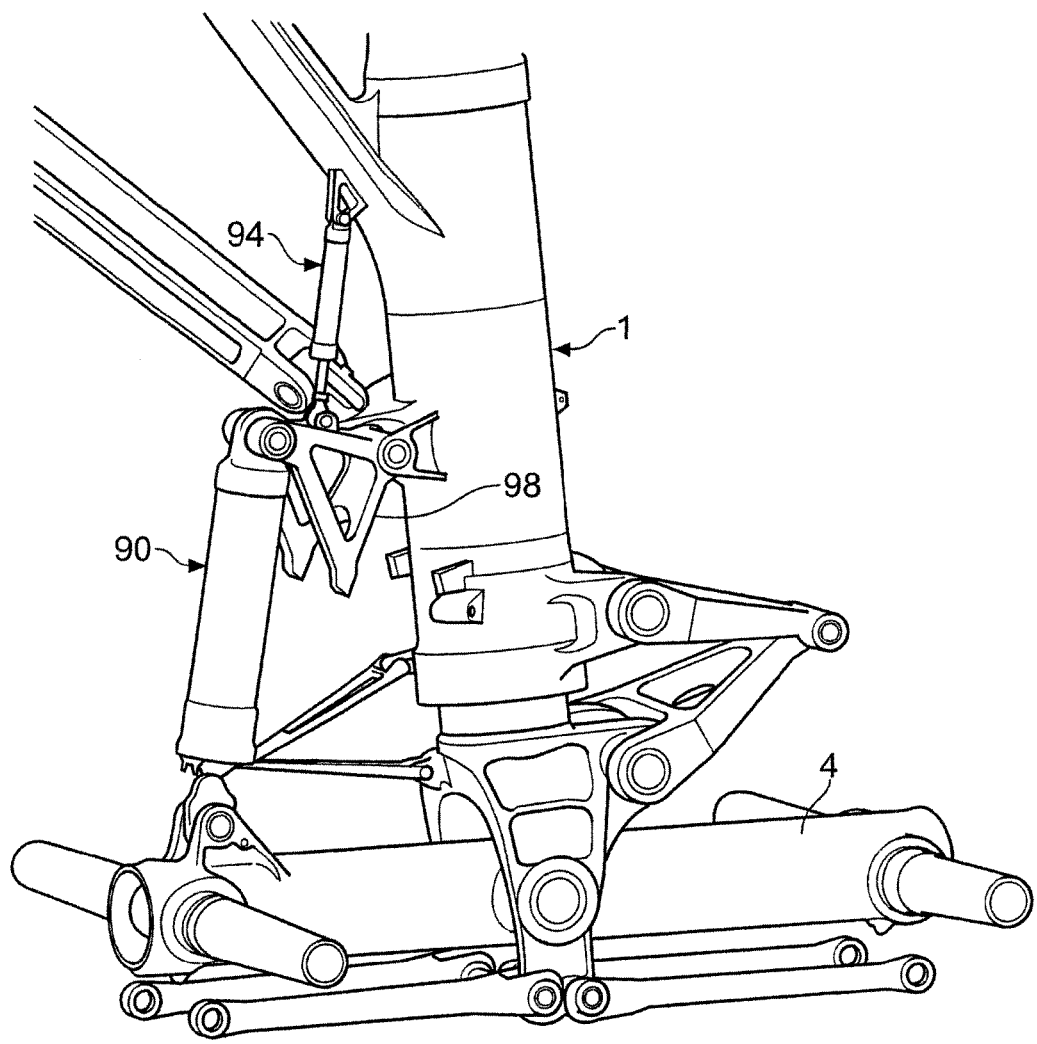
FIG. 14 is a similar view to that of FIG. 13 showing the auxiliary actuator mechanism in the taxiing state.

During taxiing, the bogie beam 4 assumes a more horizontal position, as shown in FIG. 14, and a compression force applied to the positioning actuator 90 causes it to pivot the swinging link 91 upwardly to separate the abutment arm 98 from the strut 1. The spring/damper 94 then retracts to accommodate the upwards movement of the swinging link 91. As the bogie beam pivots when taxiing on an undulating runway, the positioning actuator 90 and swinging link 91 pivot together and the spring/damper 94 contracts or extends to dampen these movements.

Figure 15:
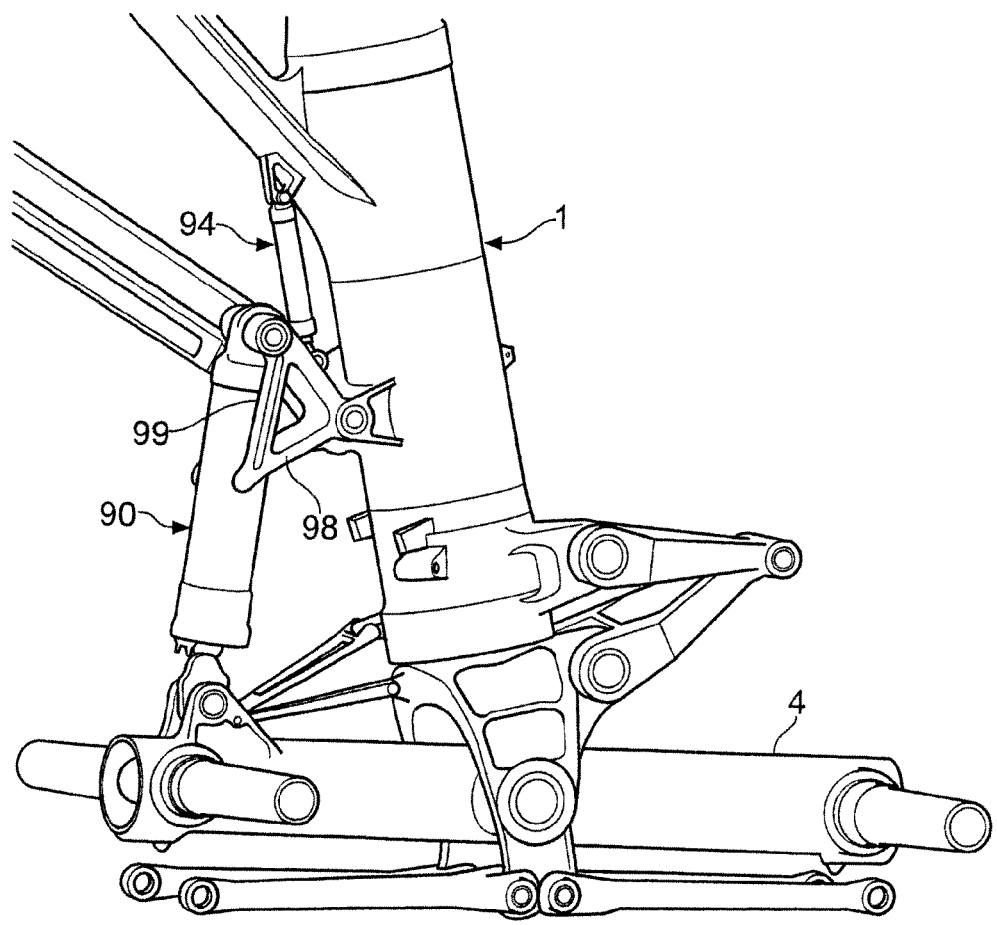
FIG. 15 is a similar view to that of FIG. 13 showing the auxiliary actuator mechanism in the fully retracted state.

Under extreme circumstances, the landing gear can assume the position shown in FIG. 15 in which the positioning actuator 90 has moved upwards enough to pivot the swinging link 90 to cause the abutment arm 99 to abut the outer casing of the positioning actuator 90.

Figure 16:
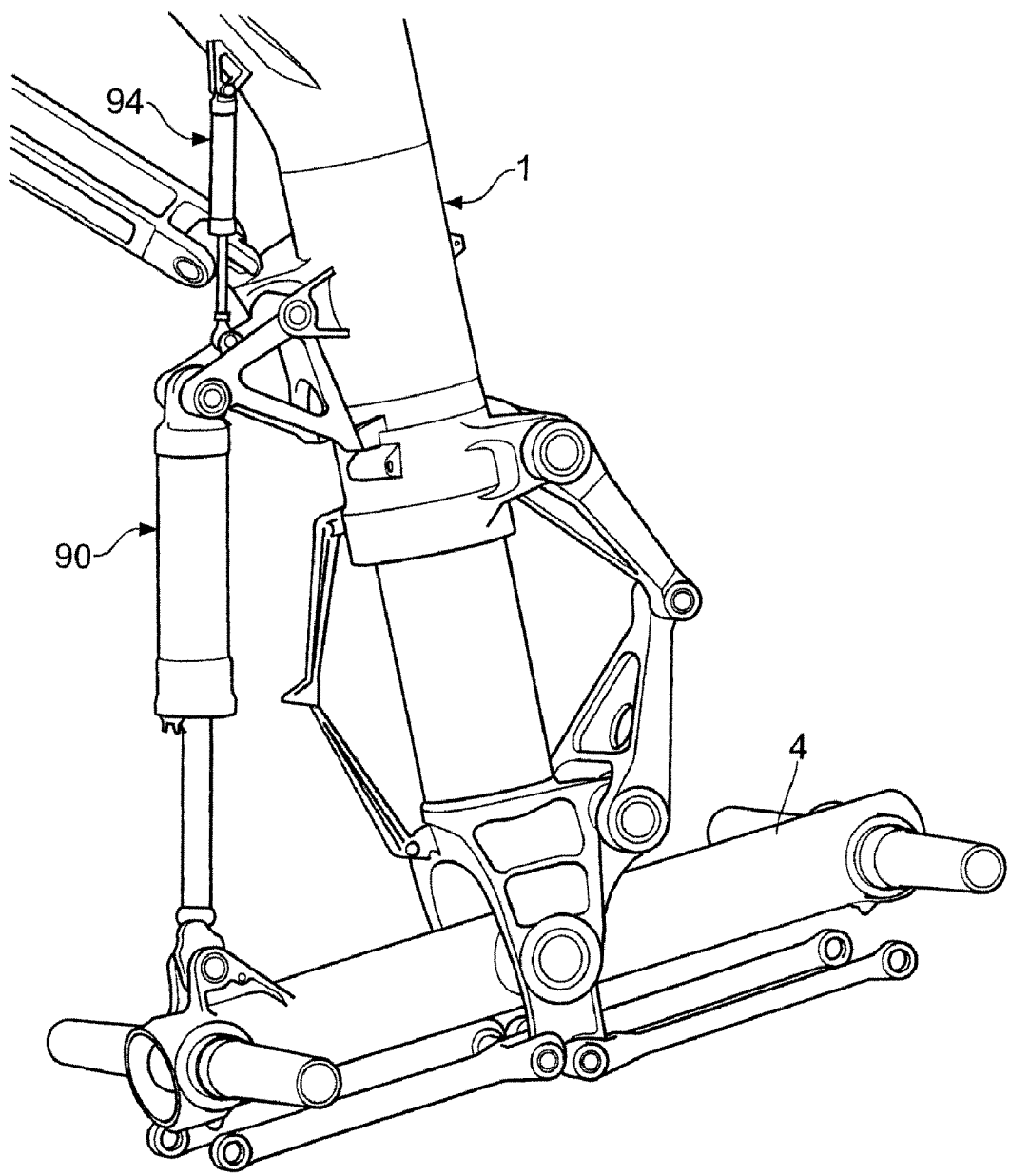
FIG. 16 is a similar view to that of FIG. 13 showing the auxiliary actuator in the stowed state.

After take-off, the positioning actuator 90 is extended as shown in FIG. 16, which serves to tilt the bogie beam to a more horizontal position for stowing of the landing gear in the aircraft.

Figure 17:
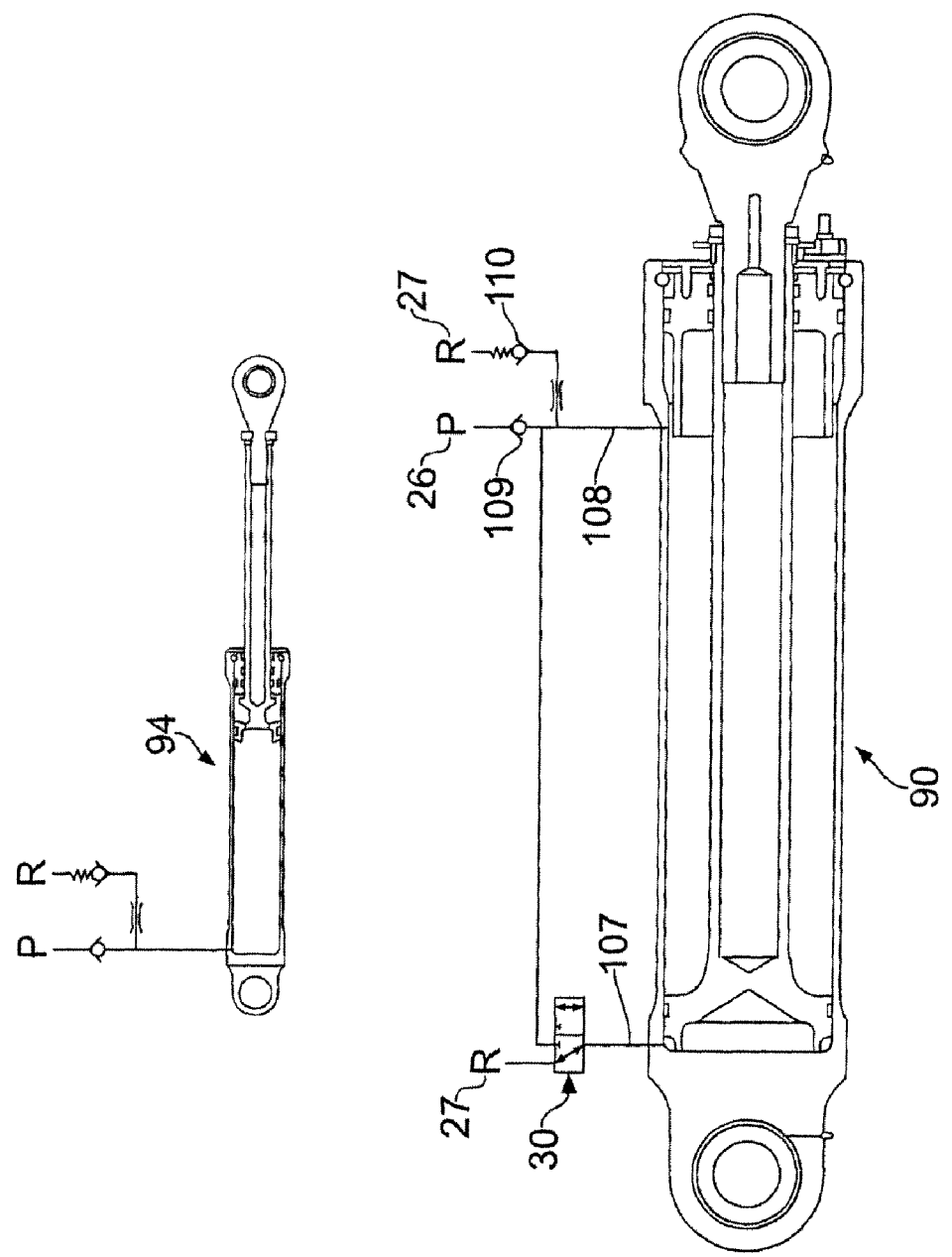
FIG. 17 shows the spring/damper and positioning units of the auxiliary actuator mechanism of FIGS. 13 to 16 including the hydraulic control circuits.

The positioning actuator 90 and spring/damper 94 are both illustrated in FIG. 17 together with the associated hydraulic controls comprising a selector valve 30 with inputs connected to supply pressure 26 and return 27, and an output connection 107 to the head end of the positioning actuator 90; and a connection 108 from the pressure supply 26 to the piston rod end of the positioning actuator 90. A non-return valve 109 and pressure relief valve 110 allow return fluid flow. The detailed control circuit will be similar to that shown in FIG. 3 and is similarly incorporated in a manifold connected to the outer casing of the positioning actuator 90.

Figure 18:
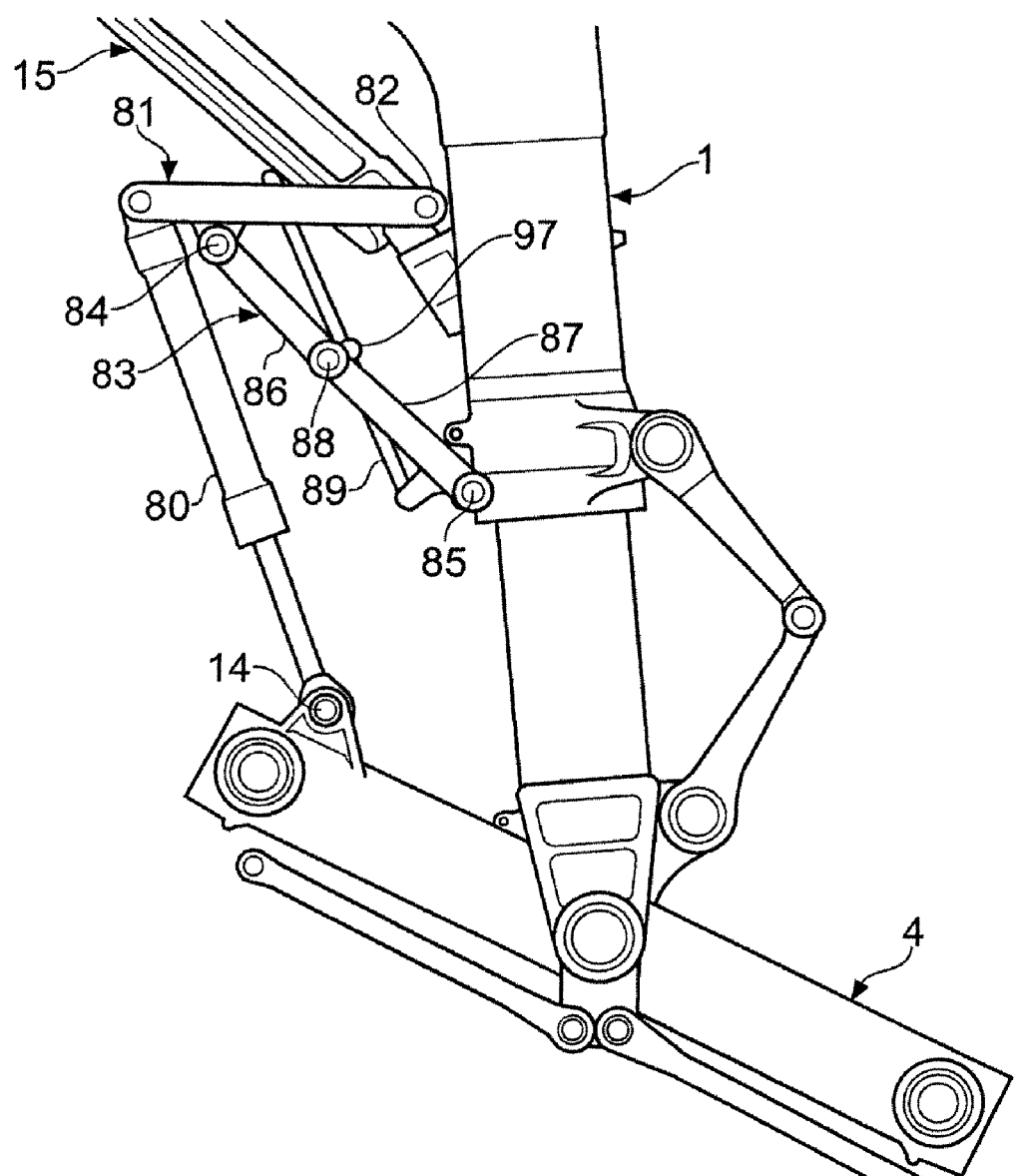
FIG. 18 is a schematic side view of an auxiliary actuator mechanism according to a fourth embodiment of the invention in the take-off or landing state.

In yet another embodiment of the invention, the auxiliary actuator comprises a hydraulic spring damper and a mechanical linkage connected to the upper end portion 2 of the main strut 1 and the side stay 15 such that movement of the side stay as the landing gear moves to the stowed position will pivot the bogie beam 4 to the stowing position. As shown in FIG. 18, the spring/damper 80 is connected between the pivot point 14 on the bogie beam 4 and the outer end of a radius link 81 which is pivotally connected to the upper portion 2 at 82. A lower linkage 83 is connected at its upper end to an intermediate point 84 on the radius link 81 and at its lower end to a pivot point 85 on the upper portion 2 of the strut below the pivot point 82. The lower linkage 83 consists of two shorter links 86, 87 connected end to end so that there is a central pivotal connection 88. The lower link 87 is connected by a control link 89 to the side stay 15 so that stowing movement of the side stay will control the position of the link 87, and thereby the radius link 81, the spring damper 80 and the bogie beam 4.

As shown in FIG. 18, the landing gear is deployed for take-off or landing, and the two short links 86, 87 are locked in a straight or slightly over centre position in which abutments 97 on each, engage. The spring damper 80 then holds the leading end of the bogie beam 4 in a raised position with the bogie beam tilting downwards towards the rear wheel.

Figure 19:
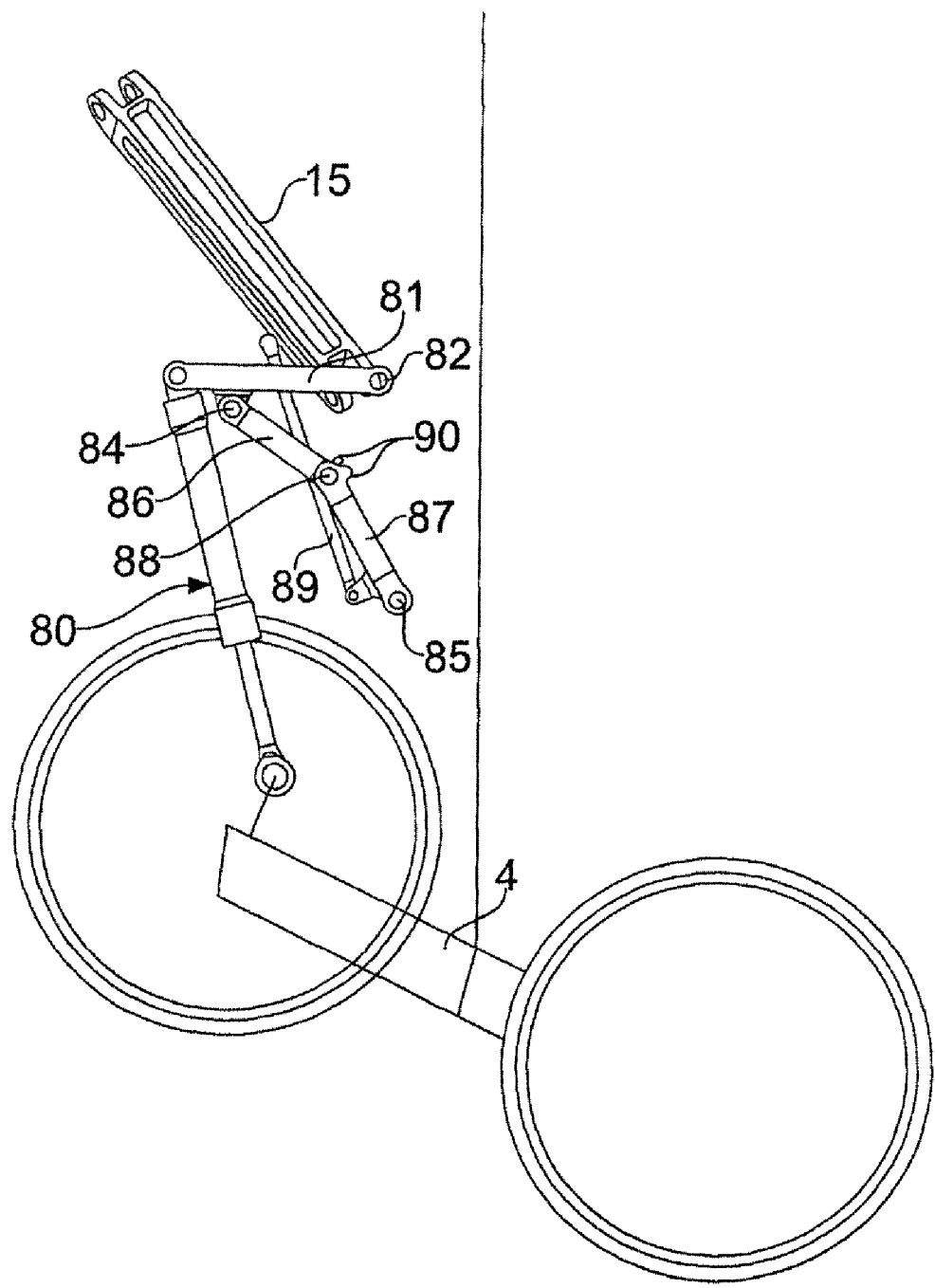
FIG. 19 is a schematic side view similar to that of FIG. 18 in a semi-stowed state.

FIG. 19 is a schematic drawings showing the landing gear in an intermediate position after the side stay 15 has begun to move in stowing the landing gear. The strut 1 has been omitted for clarity but its centerline is shown. The control link 89 has now pivoted the lower link 87 so that the two short links 86, 87 start to close together. This effective shortening of the links 86, 87 pivots the radius arm 81 downwards together with the spring damper 80.

Figure 20:
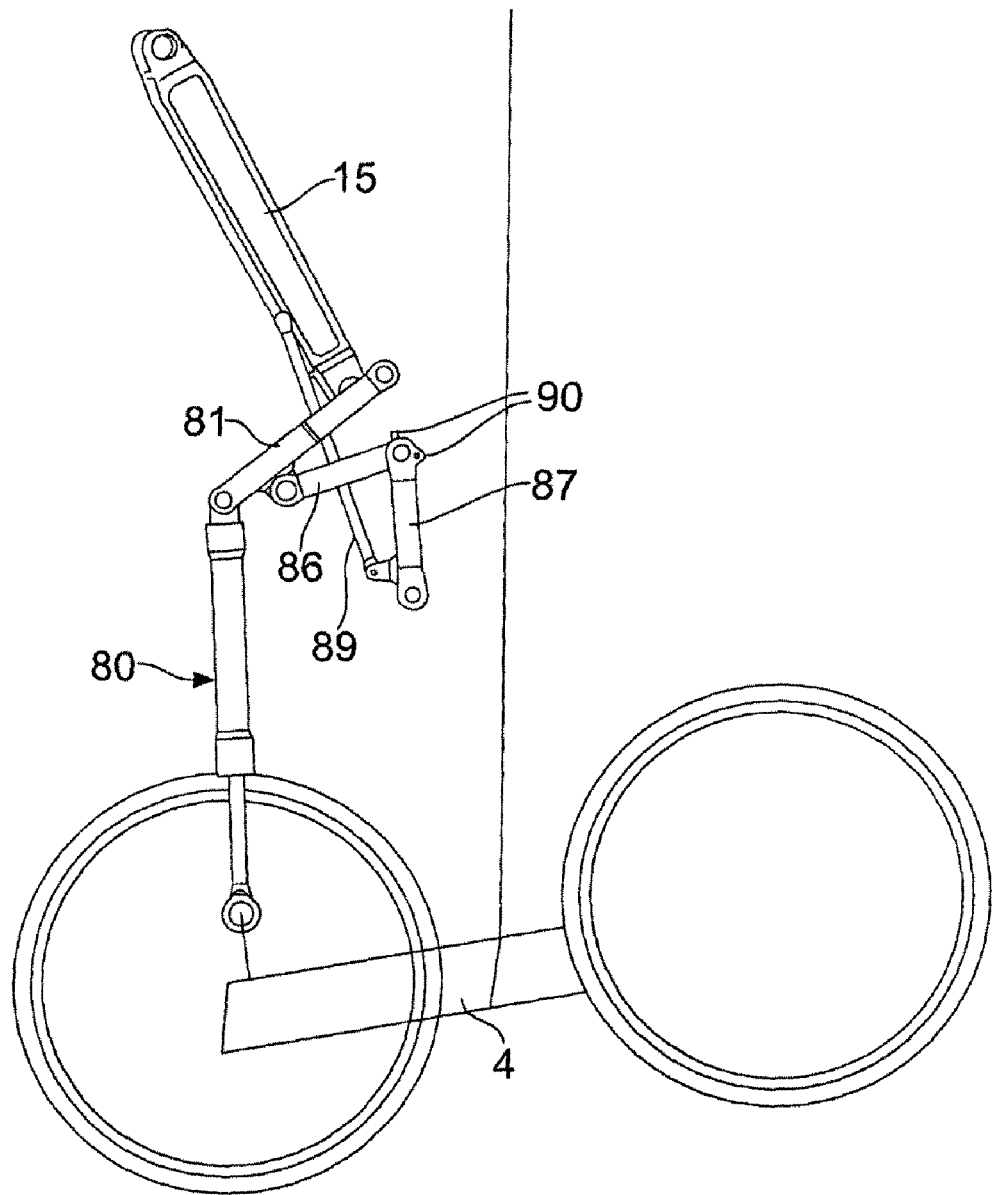
FIG. 20 is a schematic side view similar to that of FIG. 18 in a fully stowed state.

FIG. 20 shows yet a later state of the landing gear as the side stay 15 continues to stow the landing gear. The two links 86, 87 have been closed to a maximum extent and the radius link 81 has been rotated downwards to a maximum extent. The bogie beam 4 now assumes a more horizontal orientation suitable to be received in a stowage bay in the aircraft.

The advantages of the auxiliary actuator illustrated in FIGS. 18 to 20 is that it is a simple mechanical arrangement and is not affected by hydraulic or electrical failures. This arrangement is also compact and stable. The spring damper 80 comprises a similar unit to unit 94 shown in FIG. 17.

Figure 21:
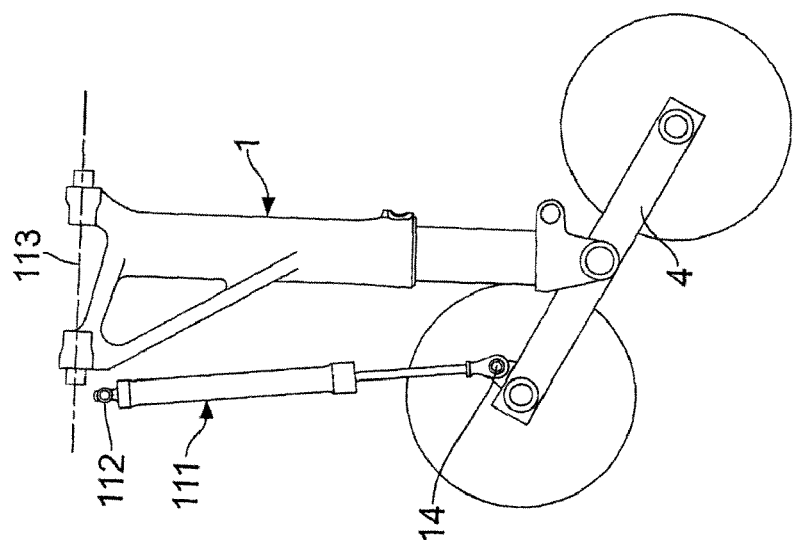
FIG. 21 is a side elevation of a semi-levered landing gear according to a fifth embodiment of the invention shown in the take-off state.
Figure 22:
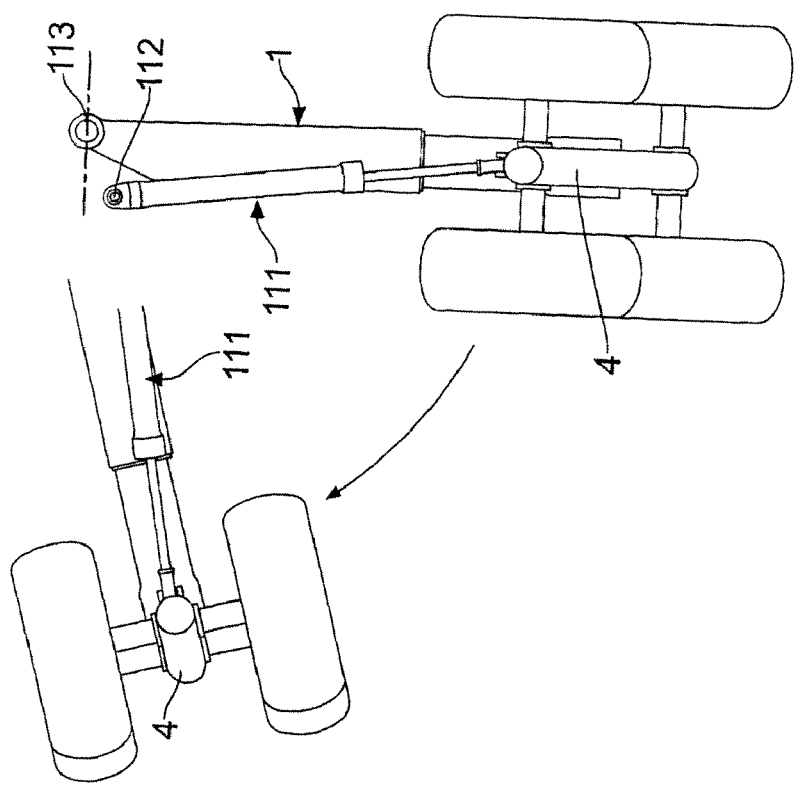
FIG. 22 is a side elevation of the landing gear of FIG. 21 seen in a viewing direction perpendicular to that in FIG. 21, with the landing gear shown moving to the stowed position.

Another embodiment of the invention is illustrated in FIG. 21 in which a spring damper 111 in connected between the pivot point 14 at the front end of the bogie beam and a pivot point 112 on the airframe spaced from the pivot point 113 of the main strut 1. The spring damper 111 is similar to the spring damper 94 shown in FIG. 17. The spring damper 111 is fully extended for take-off and landing. After take-off, the main strut 1 is pivoted by the stowing actuator about the pivot point 113. The spring damper 111 also pivots about its pivot point 112, but because the pivot point 112 is offset in the stowing direction from the pivot point 113, as shown in FIG. 22, the lower end of the strut 1 and lower end of the spring damper 111 move in different arcs, which causes an effective lengthening of the spring damper 111, and further tilting of the bogie beam 4 to a more horizontal stowing position, as shown in FIG. 22.

What is claimed is:

1. A semi-levered landing gear for an aircraft comprising:
   a main shock absorber strut with upper and lower telescoping portions, with the upper portion connectable to the airframe;
   a bogie beam to extend fore and aft of the aircraft fuselage with at least one forward axle and one aft axle for respective forward and aft wheels and a main pivot between the forward and aft axle pivotally connected to the lower portion of the main shock absorber strut;
   and an auxiliary actuator mechanism comprising a lever pivotally connected to the upper portion of the main shock absorber strut so as to pivot between a predetermined lower position for take-off and landing and an upper position, a spring unit pivotally connected at an upper end to the upper portion of the main shock absorber strut and pivotally connected at a lower end to the lever, and a positioning unit pivotally connected at a lower end to the bogie beam at an auxiliary pivot and connected at an upper end to the lever, the positioning unit assuming a contracted state for taxiing, take-off and landing, and an extended state for stowing the landing gear after take-off, the positioning unit transferring to the lever and to the spring unit, pivotal movements of the bogie beam about the main pivot during taxiing, and the positioning unit and lever restraining the bogie beam to tilt about the auxiliary pivot and to lengthen the landing gear during take-off.

2. A semi-levered landing gear as claimed in claim 1 in which the lever has an abutment portion which abuts the upper portion of the main shock absorber strut to define said predetermined lower position of the lever.

3. A semi-levered landing gear as claimed in claim 1 in which the lever has a second abutment portion which abuts the positioning unit to define a maximum raised position of the positioning unit.

4. A semi-levered landing gear as claimed in claim 1 in which the positioning unit is a hydraulic unit.

5. A semi-levered landing gear as claimed in claim 1 in which the spring unit is a hydraulic unit.

6. A semi-levered landing gear as claimed in claim 5 in which the spring unit is connected to a hydraulic pressure supply and derives its resilience from flow of hydraulic fluid.

7. A landing gear as claimed in claim 1 in which the spring unit is also a damping unit.

8. An auxiliary actuator mechanism for semi-levered landing gear of an aircraft having a main shock absorber strut with upper and lower telescoping portions, with the upper portion connectable to the airframe, and a bogie beam extending fore and aft of the aircraft fuselage with at least one forward axle and wheel and one aft axle and wheel, and a main pivot between the forward and aft axle pivotally connected to the lower portion of the main shock absorber strut, the auxiliary actuator mechanism comprising:

a lever pivotally connectable to the upper portion of the main shock absorber strut so as to pivot between a predetermined lower position for take-off and landing and an upper position;

a damping unit pivotally connectable at an upper end to the upper portion of the main shock absorber strut and pivotally connected at a lower end to the lever; and a positioning unit pivotally connectable at a lower end to the bogie beam at an auxiliary pivot and connected at an upper end to the lever, the positioning unit assuming a contracted state for taxiing, take-off and landing, and an extended state for stowing the landing gear after take-off, the positioning unit transferring to the lever and to the damping unit, pivotal movements of the bogie beam about the main pivot during taxiing, and the positioning unit and lever restraining the bogie beam to tilt about the auxiliary pivot and to lengthen the landing gear during take-off.

\* \* \* \* \*

UNITED STATES PATENT AND TRADEMARK OFFICE
CERTIFICATE OF CORRECTION

| | | |
|---|---|---|
| PATENT NO. | : 8,398,020 B2 | Page 1 of 1 |
| APPLICATION NO. | : 13/332680 | |
| DATED | : March 19, 2013 | |
| INVENTOR(S) | : Bennett et al. | |

It is certified that error appears in the above-identified patent and that said Letters Patent is hereby corrected as shown below:

In the claims,

In Column 13, Line 1, in Claim 7, delete "landing gear" and insert -- semi-levered landing gear --, therefor.

Signed and Sealed this
Fourteenth Day of April, 2015

Michelle K. Lee
*Director of the United States Patent and Trademark Office*